United States Patent
Yamasaki

(10) Patent No.: US 10,214,233 B2
(45) Date of Patent: Feb. 26, 2019

(54) DRIVE APPARATUS AND ELECTRIC POWER STEERING APPARATUS USING THE SAME

(71) Applicant: DENSO CORPORATION, Kariya, Aichi-pref. (JP)

(72) Inventor: Masashi Yamasaki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 85 days.

(21) Appl. No.: 15/480,182

(22) Filed: Apr. 5, 2017

(65) Prior Publication Data
US 2017/0291635 A1  Oct. 12, 2017

(30) Foreign Application Priority Data
Apr. 6, 2016 (JP) .................. 2016-076674

(51) Int. Cl.
| | |
|---|---|
| B62D 5/04 | (2006.01) |
| H02K 11/30 | (2016.01) |
| B62D 15/02 | (2006.01) |
| H02K 5/22 | (2006.01) |
| H02P 6/16 | (2016.01) |
| H02P 27/06 | (2006.01) |
| H02M 7/00 | (2006.01) |
| H02K 11/33 | (2016.01) |

(52) U.S. Cl.
CPC ......... *B62D 5/0463* (2013.01); *B62D 5/0406* (2013.01); *B62D 15/021* (2013.01); *H02K 5/225* (2013.01); *H02K 11/30* (2016.01); *H02K 11/33* (2016.01); *H02M 7/003* (2013.01); *H02P 6/16* (2013.01); *H02P 27/06* (2013.01); *H02K 2211/03* (2013.01)

(58) Field of Classification Search
CPC ............................ B62D 5/0403; B62D 5/0406
See application file for complete search history.

(56) References Cited

U.S. PATENT DOCUMENTS

| | | | | |
|---|---|---|---|---|
| 9,780,619 | B2 * | 10/2017 | Fujimoto | .................. H02K 5/22 |
| 10,044,248 | B2 * | 8/2018 | Fujimoto | ............... H02K 11/33 |
| 2012/0161689 | A1 | 6/2012 | Yamasaki | |
| 2014/0222292 | A1 | 8/2014 | Fisher et al. | |
| 2017/0217481 | A1 | 8/2017 | Asao et al. | |

(Continued)

FOREIGN PATENT DOCUMENTS

| | | |
|---|---|---|
| JP | 2015-116095 A | 6/2015 |
| WO | WO 2017/175843 | 10/2017 |

*Primary Examiner* — Kevin Hurley
(74) *Attorney, Agent, or Firm* — Knobbe, Martens, Olson & Bear LLP

(57) ABSTRACT

The drive apparatus includes a motor, a plurality of substrates, a connector, and a connection terminal. The substrates are provided in one side of the motor in its axial direction. The connector is provided at an opposite side of the motor across the substrates in the axial direction. The connection terminal is connected to the substrates.
The substrates are arranged such that a part of the substrates are overlapped when the substrates are projected in the axial direction. An overlapped region is defined as a region where the part of the substrates are overlapped. The connection terminal penetrates, in the overlapped region, at least a part of the substrates, the connection terminal being connected to the substrates in the overlapped region.

15 Claims, 22 Drawing Sheets

(56) References Cited

U.S. PATENT DOCUMENTS

2017/0291640 A1\* 10/2017 Fujita ................... B62D 5/0409
2017/0294860 A1\* 10/2017 Yamasaki ................ B62D 5/04
2018/0178829 A1\* 6/2018 Fujimoto ............. H02K 11/215

\* cited by examiner

MOTOR SIDE

DRIVE APPARATUS AND ELECTRIC POWER STEERING APPARATUS USING THE SAME

CROSS-REFERENCE TO RELATED APPLICATION

This application is based on and claims the benefit of priority from earlier Japanese Patent Application No. 2016-76674 filed Apr. 6, 2016, the description of which is incorporated herein by reference.

BACKGROUND OF THE INVENTION

Technical Field

The present disclosure relates to a drive apparatus and an electric power steering apparatus using the same.

Description of the Related Art

An electronic control unit used for an electric power steering apparatus has been known. For example, according to Japanese Patent Application Laid-Open Publication No. 2015-116095, two substrates are provided with power modules. The power modules are connected to an input/output substrate 70 by leads disposed in an input/output side of the sealing package, and connected to a control substrate by leads disposed in the control substrate side.

According to the above-patent literature JP-A-2015-116095, the leads and the control substrate are connected at a portion where the substrates are not overlapped. Hence, a body size becomes large because of the connection portion of the leads in the control substrate. Moreover, since a plurality of substrates is connected by using individual terminals, the same information cannot be transmitted to the plurality of substrates because of an influence of a design error or the like.

SUMMARY

The present disclosure has been achieved in light of the above-described circumstances, and provides a drive apparatus capable of transmitting the same information to a plurality of substrates while an increase of wiring space is reduced, and an electric power steering apparatus using the same.

The drive apparatus according to the present disclosure includes a motor, a plurality of substrates, a connector, and a connection terminal. The motor is provided with a plurality of winding groups. The substrates are provided in one side of the motor in its axial direction. The substrates include switching elements serving as a conduction switch of the winding groups, and control component performing a driving control of the motor.

The connector is provided at an opposite side of the motor across the substrates in the axial direction. The connection terminal is connected to the substrates.

The substrates are arranged such that a part of the substrates are overlapped when the substrates are projected in the axial direction. An overlapped region is defined as a region where the part of the substrates are overlapped. The connection terminal penetrates, in the overlapped region, at least a part of the substrates, the connection terminal being connected to the substrates in the overlapped region.

According to the present disclosure, one terminal is connected to a plurality of substrates so that the same information can be transmitted to the plurality of substrates. Moreover, since a connection portion between the connection terminal and the substrate is provided at the overlapped region, an increase of the wiring space can be minimized.

DETAILED DESCRIPTION OF THE
PREFERRED EMBODIMENTS

With reference to the drawings, hereinafter, a drive apparatus according to the present disclosure and an electric power steering apparatus using the drive apparatus will be described. Hereinafter, in a plurality of embodiments, the same reference signs are applied to substantially the same configuration and the explanation thereof will be omitted.

First Embodiment

With reference to FIGS. 1 to 8, the first embodiment of the present disclosure will be described.

Figure 1:
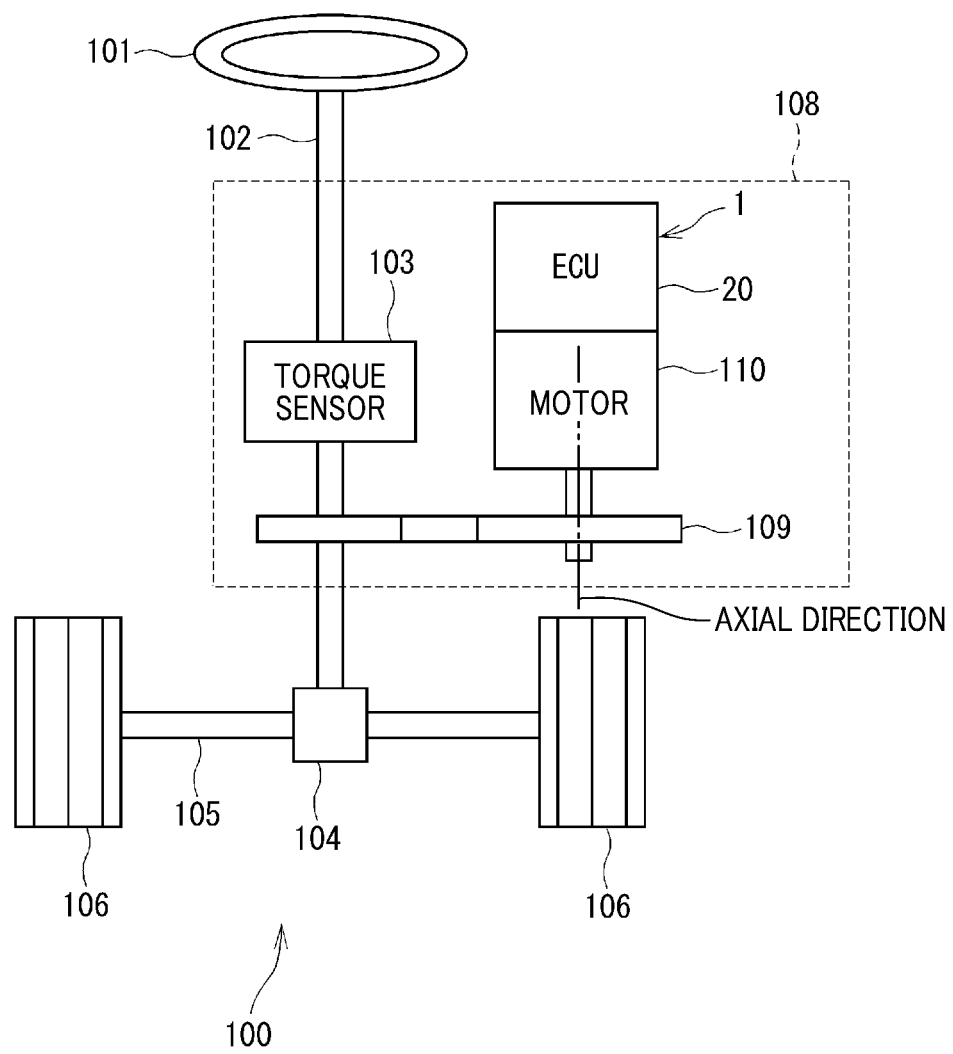
FIG. 1 is a diagram showing an overall configuration of a steering system according to a first embodiment of the present disclosure.

As shown in FIG. 1, the drive apparatus 1 is applied to an electric power steering apparatus 108 that assists a steering operation by the driver. A motor 110 as a rotary electric machine and a controller 20 that performs a driving control of the motor 110 are integrated to configure the drive apparatus 1. In FIG. 1, the controller 20 is indicated as "ECU".

FIG. 1 illustrates an overall configuration of a steering system 100 provided with an electric power steering apparatus 108. The steering system 100 is configured of a steering wheel 101 as a steering member, a column shaft 102, a pinion gear 104, a rack shaft 105, a wheel 106, and an electric power steering apparatus 108 or the like.

The steering wheel 101 is connected to the column shaft 102. The column shaft 102 is provided with a torque sensor 103 that detects a steering torque. A pinion gear 104 is provided at the tip end of the column shaft 102, and engages the rack shaft 105.

A pair of wheels 106 are provided at both ends of the rack shaft 105 via a tie rod or the like.

When the driver rotates the steering wheel 101, the column shaft 102 connected to the steering wheel 101 rotates. A rotary motion of the column shaft 102 is converted into a linear motion of the rack shaft 105 by the pinion gear 104, whereby the pair of wheel 106 is steered with an angle in response to the variation of the rack shaft 105.

The electric power steering apparatus 108 is provided with a reduction gear 109 as a power transmission member and a drive apparatus 1. The electric power steering apparatus 108 outputs, from the motor 110, an auxiliary torque that assists steering of the steering wheel 101 to be transmitted to the column shaft 102 via the reduction gear 109, based on a steering torque acquired by the torque sensor 103 and a running speed signal acquired via CAN (controller area network) which is not shown. Specifically, the electric power steering apparatus 108 according to the present embodiment assists rotation of the column shaft 102 with a torque generated by the motor 110, that is, so called "column assist". However, so called "rack assist" that assists the rack shaft 105 may be used. In other word, according to the present embodiment, the column shaft 102 is defined as the "drive object", but the rack shaft 105 may be defined as the "drive object".

Figure 2:
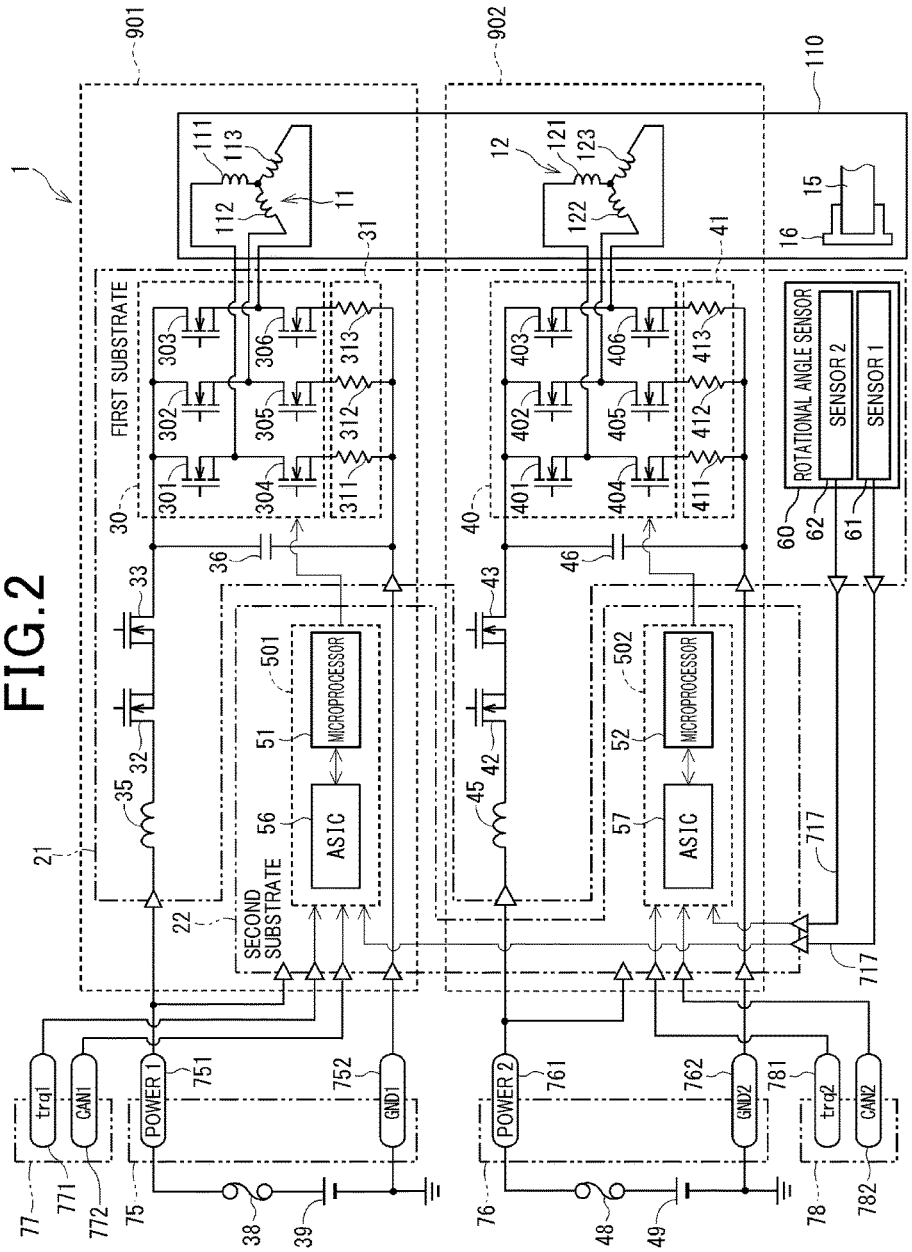
FIG. 2 is a circuit diagram showing a drive apparatus according to the first embodiment of the present disclosure.

Next, with reference to FIG. 2, electrical configuration of the electric power steering apparatus 108 will be described. In FIG. 2, wirings on the substrates 21 and 22 are shown with a thin line and a part of wirings are omitted to eliminate complications. The motor 110 is configured of a three-phase brushless motor, including 2 winding groups that is, windings 11 (first winding 11) and windings 22 (second winding 12) which wound around the stator (not shown). The first winding 11 includes an U1 coil 111, a V1 coil 112, and a W1 coil 113. The second winding 12 includes a U2 coil 121, a V2 coil 122 and a W2 coil 123. The current flowing thorough each phase of the first winding is defined as a phase current Iu1, Iv1 and Iw1, and the current flowing through each phase of the second winding is defined as Iu2, Iv2 and Iw2. The motor has a rotation axis and rotates around the rotation axis. The direction along which the rotation axis extends is defined as an axial direction.

The first winding 11 is supplied with power from a first battery 39 via a first inverter 30 connected to the first winding 11.

The first inverter 30 includes 6 switching elements 301 to 306 connected to form a bridge circuit, thereby converting the power of the first winding 11. Hereinafter, "switching element" is abbreviated as "SW element". The SW elements 301 to 306 are configured of MOSFET (metal oxide semiconductor field effect transistor), but may be configured of IGBT or thyristor. The SW elements 401 to 406 and the relay 32, 33, 42, 43 or the like which will be described later are the same as the above.

The SW elements 301 to 303 are arranged in a high-potential side and the SW elements 304 to 306 are arranged in a low-potential side. One end of an U1 coil 111 is connected to a connection point between the U-phase SW elements 301 and 304. One end of a V1 coil 112 is connected to a connection point between the V-phase SW elements 302 and 305. One end of a W1 coil 113 is connected to a connection point between the W-phase SW elements 303 and 306.

A first current sensor 31 is provided in the low potential side of the SW elements 304 to 306, to detect phase current Iu1, Iv1 and Iw1. The first current sensor 31 includes current detectors 311 to 313 provided to respective phases. The current detectors 311 to 313 according to the present embodiment are shunt resistors. However, hall elements or the like can be used therefor. The current detectors 411 to 413 are the same as the current detectors 311 to 313.

The first power relay 32 is provided between the first battery 39 and the first inverter 30 and controls the current between the first battery 39 and the first inverter 30 to be conduction or cutoff. A first reverse-connection protection relay 33 is provided between the first power relay 32 and the first inverter 30. The first reverse-connection protection relay 33 is connected such that the direction of the parasitic diode is opposite to the first power relay 32. Thus, reverse current can be prevented from flowing in the case where the first battery 39 is connected in reverse.

The first choke coil 35 is provided in the first battery 39 side of the first power relay 32.

The first capacitor 36 is connected in parallel to the first inverter 30. The choke coil 35 and the capacitor 36 configures a filter circuit to reduce noise propagated from other devices which share the battery 39, and also reduce noise propagating from the drive apparatus 1 to other devices which share the battery 39. The capacitor 36 stores electrical charge to assist supplying power to the first inverter 30.

A second inverter 40 is connected to the second winding 12 to which power is supplied from the second battery 49 via the second inverter 40.

The second inverter 40 converts the power of the second winding 12, where 6 SW elements are connected as a bridge connection. The SW elements 401 to 403 are arranged in the high potential side and the SW elements 404 to 406 are arranged in the low potential side. One end of the U2 coil 121 is connected to a connection point between the U-phase SW elements 401 and 404. One end of the V2 coil 122 is connected to a connection point between the V-phase SW elements 402 and 405. One end of the W2 coil 123 is connected to a connection point between the W-phase SW elements 403 and 406.

In the low potential side of the SW elements 404 to 406, a second current sensor 41 is provided. The second current sensor 41 includes current detectors 411 to 413.

A second choke coil 45, a second power relay 42, and second reverse-connection protection relay 43 are disposed in this order from the second battery 49 side, between the second battery 49 and the second inverter 40.

Since the second power relay 42, the second reverse-connection protection relay 43, the second choke coil 45 and the second capacitor 46 are similar to the first power relay 32, the first reverse-connection protection relay 33, the first choke coil 35 and the first capacitor 36, explanation thereof will be omitted. Assuming the power relays 32 and 42 are mechanical relays, the reverse-connection relays 33 and 43 can be omitted.

A first control unit 501 controls conduction of the first winding 11, including a first microprocessor 51 and a first integrated circuit 56. It should be noted that the integrated circuit is denoted as ASIC (application specific integrated circuit) in the drawings.

The first microprocessor 51 generates a control signal that controls ON/OFF operation of the SW elements 301 to 306 of the first inverter 30, the relay 32 and the relay 33, based on detection values of the first current sensor 31, a rotation sensor 60 and the torque sensor 103 (see FIG. 1).

The first integrated circuit 56 includes a pre-driver, a signal amplifier and a regulator.

The pre-driver generates a gate signal in accordance with a control signal. The generated gate signal is outputted to gates of the SW elements 301 to 306. Thus, the SW elements 301 to 306 are ON-OFF controlled. The signal amplifier amplifies the detection signals of the first current sensor 31 or the like and outputs the amplified detection signals to the first microprocessor 51. The regulator stabilizes the voltage supplied to the first microprocessor 51 or the like.

A first control unit 502 controls conduction of the second winding 12, including a second microprocessor 52 and a second integrated circuit 57.

The second microprocessor 52 generates a control signal that controls ON/OFF operation of the SW elements 401 to 406 of the second inverter 40, the relay 42 and the relay 43, based on detection values of the second current sensor 41, the rotation sensor 60 and the torque sensor 103 (see FIG. 1).

The second integrated circuit 57 includes a pre-driver, a signal amplifier and a regulator.

The pre-driver generates a gate signal in accordance with a control signal. The generated gate signal is outputted to gates of the SW elements 401 to 406. Thus, the SW elements 401 to 406 are ON-OFF controlled. The signal amplifier amplifies the detection signals of the second current sensor 41 or the like and outputs the amplified detection signals to the second microprocessor 52. The regulator stabilizes the voltage supplied to the second microprocessor 52 or the like.

The rotation sensor 60 includes a first sensor 61 and a second sensor 62. In the drawings, the first sensor 61 is described as "sensor 1" and the second sensor 62 is described as "sensor 2".

Each of the sensors 61 and 62 is configured as an IC including a sensor element that detects a magnetic flux changing in response to a rotation of a magnet 16, an A/D converter that converts a detection signal of the sensor element into digital data, and a calculator that calculates various calculations based on the A/D converted detection value. According to the present embodiment, the output signal of the first sensor 61 is outputted to the first microprocessor 51 and the output signal of the second sensor 62 is outputted to the microprocessor 52.

In accordance with the detection value, the calculator has a function of calculating a rotational angle of the motor 110 and a function of calculating a rotational frequency of the motor 110, based on the detected value, and outputs information about the rotational angle and information about the rotation frequency to the microprocessors 51 and 52. Even when the system is stopped, the rotational frequency of the motor 110 is counted so that a rotational angle of the steering wheel 101 as a steering angle can be appropriately calculated in accordance with the rotational angle and the rotation frequency of the motor 110. As a result, a steering sensor detecting the steering angle can be omitted.

In the following description, the first winding 11, and the first inverter 30 and the first control unit 501 or the like provided corresponding to the first wirings 11 are denoted as a first system 901. The second windings 12, and the second inverter 40 and the second control unit 502 or the like provided corresponding to the second windings 12 are denoted as a second system 902. In the drawings, to avoid complication, the rotation sensor 60 is not included in the systems 901 and 902. However, the first sensor 61 may be included in the first system 901 and the second sensor 62 may be included in the second system 902. Also, in the drawings, the first system 901 is denoted as "system 1" and the second system 902 is denoted as "system 2".

According to the present embodiment, circuit components such as the first inverter 30 and the first control unit 501 are provided corresponding to the first winding 11, and circuit components such as the second inverter 40 and the second control unit 502 are provided corresponding to the second windings 12. Hence, even when a malfunction occurs in a part of the circuit components such as the inverters 30 and 40, and either the first control unit 501 and the second control unit 502, the motor 110 can be driven continuously. In other words, in the drive apparatus 1 according to the present embodiment, the circuit configuration including the control units 501 and 502 is configured as a redundant configuration.

According to the present embodiment, the first battery 39 and the second battery 49 are provided, and also batteries are configured as a redundant configuration. Different voltages may be used for the batteries 39 and 49. When the voltages of the battery 39 and 49 are different, for example, a voltage converter or the like may be disposed at least between the first battery 39 and the first inverter 30, or between the second battery 49 and the second inverter 40.

In the positive electrode sides of the batteries 39 and 49, fuses 38 and 48 are provided.

Figure 4:
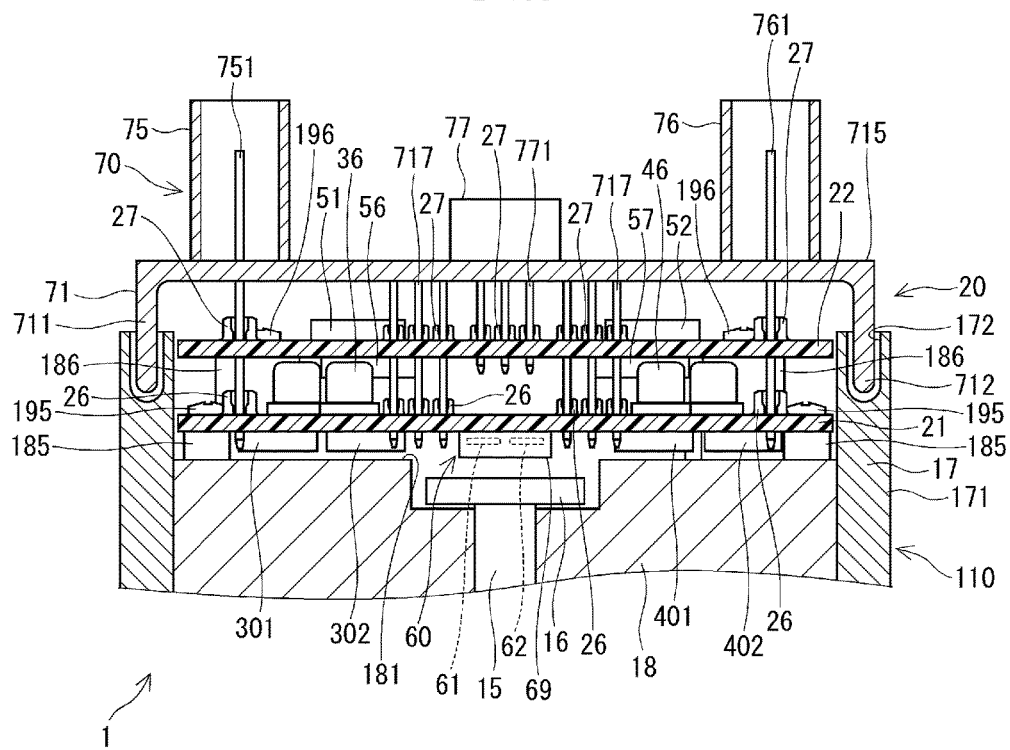
FIG. 4 is a cross-sectional sectioned along line IV-IV shown in FIG. 3.
Figure 5:
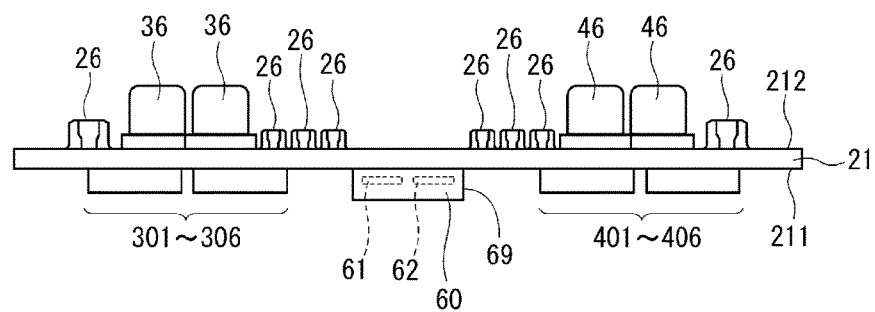
FIG. 5 is a side view showing a first substrate of the first embodiment of the present disclosure.
Figure 6:
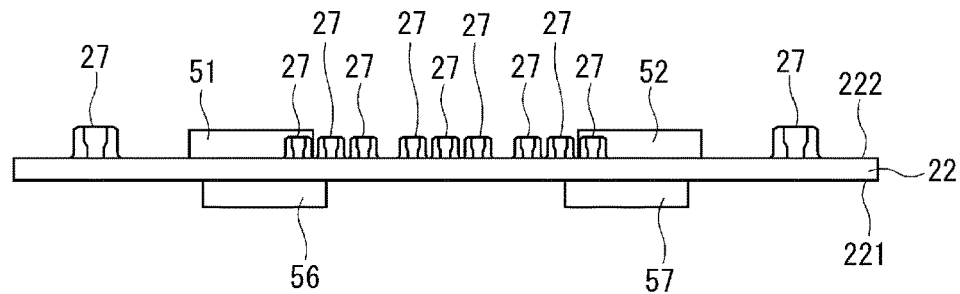
FIG. 6 is a side view showing a second substrate according to the first embodiment of the present disclosure.

As shown in FIGS. 2, 4 and 5, the SW elements 301 to 306, 401 to 406 which are driving components, the current detectors 311 to 313, 411 to 413, the relays 32, 33, 42 and 43, the choke coils 35 and 45, and capacitors 36 and 46 are mounted on the first substrate 21. As shown in FIGS. 2, 4 and 6, as the control components, the microprocessors 51 and 52 and integrated circuits 56 and 57 are mounted on the second substrate 22. The driving components serve as power components where large amount of current flows, similar to current flowing through the coils 111 to 113, and 121 to 123. The control components serve as components where no motor current flows. A rotation sensor 60 is mounted on the first substrate 21.

A white triangle in the circuit diagram denotes a connection point between each terminal and the substrates 21 and 22. According to the present embodiment, power terminals 751 and 761, the ground terminals 752 and 762, and an internal signal terminal 717 are connected to the first substrate 21 and the second substrate 22, respectively. On the other hand, torque terminals 771 and 781, and the vehicle signal terminals 772 and 782 are connected to the second substrate 22 and not connected to the first substrate 21. Details of the terminal connection will be described later.

In FIG. 2, the power terminal is denoted as "power 1", "power 2", the ground terminal is denoted as "GND1" and "GND2", the torque signal terminal is denoted as "trq1" and "trq2", and the vehicle signal terminal is denoted as "CAN 1", "CAN 2". Moreover, in the circuit diagrams such as FIG. 2, note that a branched line indicating a relationship between a terminal and a substrate does not necessarily mean that the actual terminal is branched.

The structure of the drive apparatus 1 is shown in FIGS. 3 to 6. As shown in FIG. 4, the motor 110 includes a stator in which the windings 11 and the windings 12 (see FIG. 2) are wound, a rotor, and a shaft 15. The stator is fixed to inside a motor case 17. The rotor is provided as being relatively rotatable with respect to the stator. The shaft 15 is fixed on the center axis of the rotor. Thus, the shaft 15 and the rotor are integrated and rotated.

At an opposite end portion of the shaft 15 relative to the controller 20, a reduction gear 109 (see FIG. 1) and an output terminal which is not shown are provided. Thus, the torque generated by a rotation of the rotor and the shaft 15 is transmitted to the column shaft 102 via the reduction gear 109. In the specification, it should be noted that rotation of the rotor and the shaft 15 is simply referred to as "motor 110 rotates".

A magnet 16 rotating integrally with the shaft 15 is provided at an end portion in the controller 20 side of the shaft 15.

The motor case 17 includes a cylindrical member 171 formed in a substantial cylindrical shape. The stator, the rotor and the shaft 15 are accommodated inside the radial direction of the motor case 17.

A frame 18 is provided in a controller 20 side of the stator and the rotor, and fixed inside the radial direction of the motor case 17, by press fitting or the like. According to the present embodiment, the motor case 17 and the frame 18 form an outline of the motor 110. The shaft 15 is inserted into the frame 18, and the magnet 16 is exposed to the controller 20 side.

Substrate fixing portions 185 and 186 are provided on an end surface 181 of the frame 18 in the controller 20 side. The first substrate 21 is disposed on the first substrate fixing portion 185, and fixed by a screw 195. The second substrate fixing portion 186 is formed such that the height relative to the end surface 181 is larger than the height of the first substrate fixing portion 185. The second substrate fixing portion 186 is inserted into a hole (not shown) portion of the first substrate 21. The second substrate 22 is disposed on the second substrate fixing portion 186, and fixed by the screw 196. The substrates 21 and 22 and the frame 18 may be fixed by a member other than the screw.

Coils 111 to 113 corresponding to respective phases of the first winding 11 and coils 121 to 123 corresponding to respective phases of the second windings 12 are connected to un-shown motor lines. The motor lines are inserted into a motor line insertion hole (not shown) formed in the frame 18, and withdrawn to be connected to the substrate 21.

The controller 20 is provided at one side of the motor 110 in the axial direction. The controller 20 is provided as being accommodated in a motor silhouette which is a projection region where the motor case 17 is projected in the axial direction. Hereinafter, the axial direction and the radial direction of the motor 110 are simply referred to as "axial direction" and "radial direction" as an axial direction and a radial direction of the drive apparatus 1.

The controller 20 includes the substrates 21 and 22 on which various electronic components are mounted, and a connector unit 70.

The first substrate 21 and the second substrate 22 are disposed as being substantially horizontal with respect to the end surface of the frame 18. According to the present embodiment, the first substrate 21 and the second substrate 22 are disposed in this order from the motor 110 side. Here, a surface in the motor 110 side of the first substrate 21 is referred to as a first surface 211, a surface in an opposite side of the motor 110 of the first substrate 21 is referred to as the second surface 212. Similarly, a surface in the motor 110 side of the second substrate 22 is referred to as the first surface 221 and a surface in an opposite side of the motor 110 of the second substrate 22 is referred to as the second surface 222 (see FIGS. 5 and 6).

As shown in FIGS. 4 and 5, the SW elements 301 to 306, 401 to 406, the current detectors 311 to 313, 411 to 413, and the rotation sensor 60 or the like are mounted on the first surface 211 of the first substrate 21. The choke coils 35 and 45, and capacitors 36 and 46 are mounted on the second surface 212 of the first substrate 21.

It should be noted that the SW elements 301, 302, 401 and 402 are illustrated in FIG. 4. However, in the structure diagram, illustration is omitted for the current detectors 311 to 313, 411 to 413, and the choke coils 35 and 45 or the like. Similarly, illustrations are omitted for those elements in the drawings according to the embodiments which will be described later.

The SW elements 301 to 306 and 401 to 406 are provided being capable of radiating heat to the frame 18. Thus, heat generated by the SW elements 301 to 306 and 401 to 406 is dissipated outside the drive apparatus 1 from the motor case 17 via the frame 18. It should be noted that "provided as being capable of radiating heat" is not limited to the case where the SW elements 301 to 306, and 401 to 406 directly contact the frame 18, but includes the case where the SW elements indirectly contact with the frame 18 via a heat-dissipation member such as heat dissipation gel, for example. In FIG. 4, since the heat dissipation member is omitted, the SW elements 301 to 306 and 401 to 406, and the frame 18 are spaced from each other.

According to the present embodiment, the frame 18 serves as a heat sink. In other words, the frame 18 is provided with both of a function as an outline of the motor 110 and a function as a heat sink. Accordingly, compared to the case where a heat sink is provided separately, the number of components can be reduced and the size thereof can be smaller. Further, by utilizing the frame 18 as a heatsink, a heat propagation path to the atmosphere can be shortened to dissipate heat efficiently.

According to the present embodiment, the SW elements 301 to 306 and 401 to 406 are defined as "heat-generating elements". In addition to the SW elements 301 to 306 and 401 to 406, electric components other than the SW elements such as current detectors 311 to 313 and 411 to 413 may be regarded as heat-generation elements, and may be provided to the frame 18, as being capable of radiating heat.

The rotation sensor 60 is mounted at a portion facing the magnet 16 on the first surface 211 of the first substrate 21. According to the present embodiment, each of the first sensor 61 and the second sensor 62 are configured as an IC chip and accommodated in a single package 69. The rotation sensor 60 is mounted such that respective distances from magnetic sensors included in the sensors 61, 62 to the center of the magnet 16 are the same. For each magnetic sensor, a Hall element or a magneto-resistive (MR) element or the like can be used.

As shown in FIGS. 4 and 6, the integrated circuits 56 and 57 are mounted on the first surface 221 of the second substrate 22, and the microprocessors 51 and 52 are mounted on the second surface 222 of the second substrate 22. According to the present embodiment, driving components are mounted on the first substrate 21 to allow the motor current to flow, and control components are mounted on the second substrate 22. In other words, the first substrate 21 is defined as a power substrate and the second substrate 22 is defined as a control substrate so as to separate a power circuit portion and a control circuit portion. As a result, a large amount of current, which can be a noise source, does not flow in the second substrate 22 as a control substrate, whereby noise is prevented from influencing the control components.

A spring terminal 26 is provided on the second surface 212 of the first substrate 21. A spring terminal 27 is provided on the second surface 222 of the second substrate 22. In FIGS. 4 to 6, for the spring terminals 26 and 27, cross-sectional shapes are illustrated for explanation purpose. Detailed configurations of the spring terminals 26 and 27 will be described later.

As shown in FIGS. 4 to 7, when dividing the substrates 21 and 22 into two regions, in a region where a first power supply connector 75 is connected, the SW elements 301 to 306, the choke coil 35, the choke coil 35, the first microprocessor 51 and the first integrated circuit 56 are mounted. Also, when dividing the substrates 21 and 22 into two regions, in a region where a second power supply connector 76 is connected, the SW elements 401 to 406, the choke coil 45, the choke coil 46, the second microprocessor 52 and the second integrated circuit 57 are mounted. In other words, in a region where the first power supply connector 75 is provided, electronic components related to the first system 901 are mounted, and in a region where the second power supply connector 76 is provided, electronic components related to the second system 902 are mounted. Since the electronic components related to the first system 901 and the electronic components related to the second system 902 are separately mounted, heat produced in one system is unlikely to influence to the other system.

Figure 7:
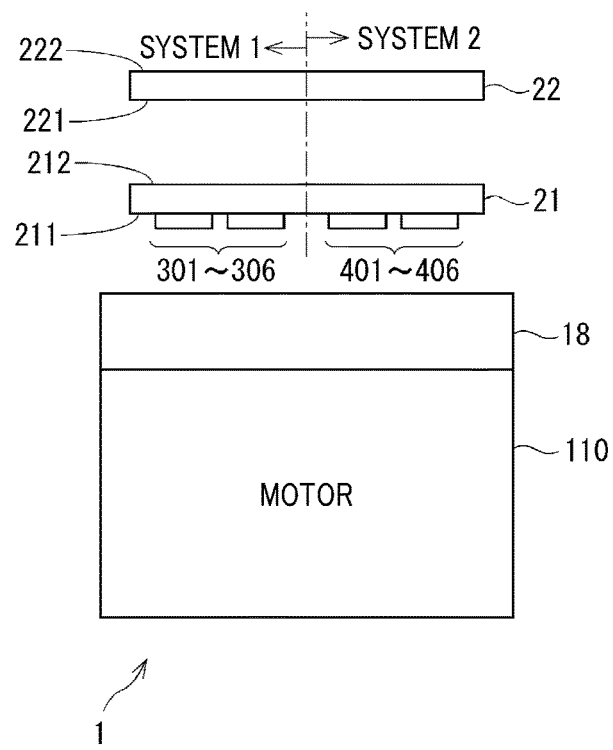
FIG. 7 is a schematic side view illustrating an arrangement of systems of the drive apparatus according to the first embodiment of the present disclosure.

In FIG. 7 which is a schematic side view, the control components and the connector unit 70 are omitted. Similarly, the control components and the connector unit 70 are omitted in FIGS. 17 and 22.

Figure 3:
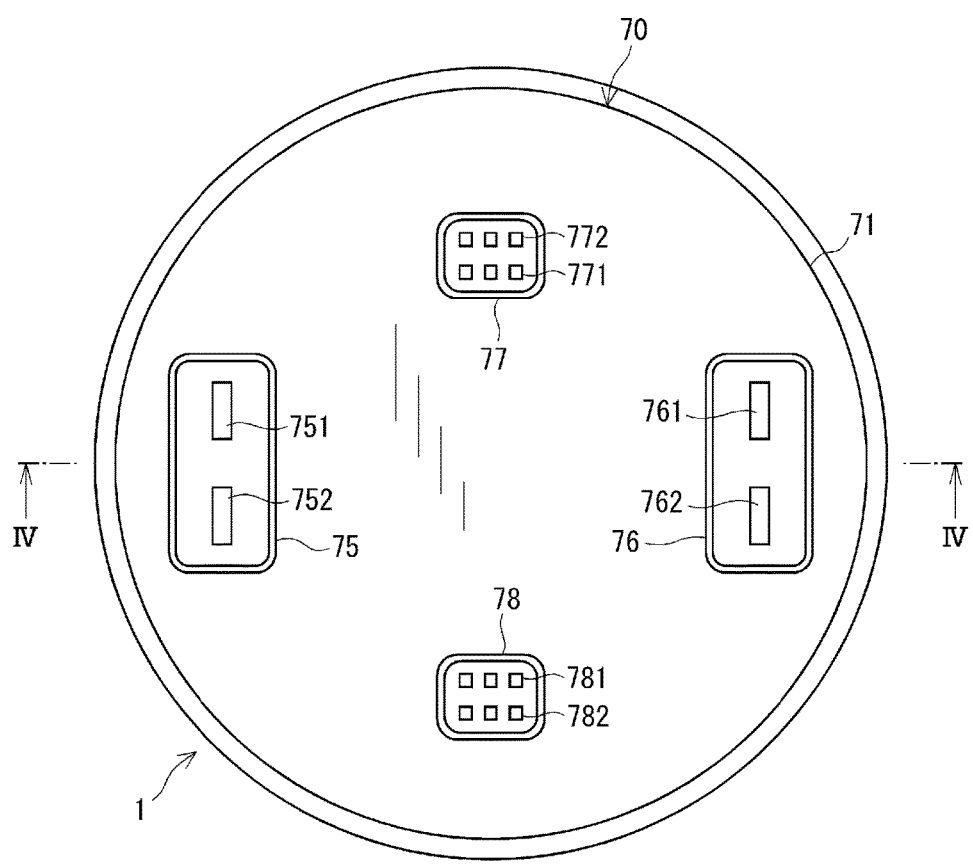
FIG. 3 is a plan view of the drive apparatus according to the first embodiment of the present disclosure.

As shown in FIGS. 3 and 4, the connector unit 70 includes a cover 71, power supply connectors 75 and 76, signal connectors 77 and 78. According to the present embodiment, the connectors 75 to 78 correspond to "connector".

The cover 71 is formed in a substantial bottomed cylindrical shape, including a cylindrical member 711 and a connector forming portion 715. A tip portion of the cylindrical member 712 is inserted into a groove portion 172 formed in the cylindrical member 171 of the motor case 17 and fixed thereto by an adhesive or the like.

The power supply connectors 75 and 76, and the signal connectors 77 and 78 are formed on the connector forming portion 715 and at an opposite side relative to the motor 110. The connectors 75 to 78 are arranged in the motor silhouette. The connectors 75 to 78 according to the present embodiment have the openings which are open to an opposite side of the motor 110, to which harnesses or the like are inserted in the axial direction.

As shown in FIGS. 2 to 4, the first power supply connector 75 is used to connect the first battery 39 and the ground. The first power supply connector is provided with a first power terminal 751 and the first ground terminal 752. The second power supply connector 76 is used to connect the second battery 49 and the ground. The second power supply connector 76 is provided with a second power terminal 761 and a second ground terminal 762.

The first signal connector 77 and the second signal connector 78 are used to connect the torque sensor 103 and a CAN (controller area network) signal which is not shown.

The first signal connector 77 is provided with a first torque signal terminal 771 used for accepting a signal transmitted from the torque sensor 103, and a first vehicle signal terminal 772 used for accepting a signal transmitted from the CAN. The second signal connector 78 is provided with a second torque signal terminal 781 used for accepting a signal transmitted from the torque sensor 103, and a second vehicle signal terminal 782 used for accepting a signal transmitted from the CAN.

A plurality of openings are provided for the power supply connectors 75 and 76, and the signal connectors 77 and 78, whereby the motor 110 can be continuously driven even when a part of wirings is disconnected or broken.

The internal signal terminal 717 is provided in a motor 110 side of the connector forming portion 715 of the cover 71. The internal signal terminal 717 is connected to the first substrate 21 and the second substrate 22 and used for transmitting a signal between the first substrate 21 and the second substrate 22. The internal signal terminal 717 are provided separately from the terminals 751, 752, 761, 762, 771, 772, 781 and 782 of the connectors 75 to 78. Hence, the internal signal terminals are not connected to external devices outside the drive apparatus 1, such as the batteries 39 and 49, the torque sensor 103 and CAN.

According to the present embodiment, the internal signal terminal 717 is used for transmitting the detection value of the rotation sensor 60 to the second substrate 22. In more detail, the internal signal terminal 717 transmits the detection value of the second sensor 62 of the rotation sensor 60 to the second substrate 22.

For the first power supply connector 75, the number of terminals, an arrangement thereof and an assignment of signals can be appropriately changed. Similarly, the number of terminals, an arrangement thereof and an assignment of signals can be appropriately changed for the second power supply connector 76, and the signal connectors 77 and 78. The internal signal terminal 717 can be provided in any locations as long as the internal signal terminal 717 does not interfere with each of the connectors 75 to 78. Moreover, the number of the internal signal terminal 717 is not limited to the number of terminals illustrated in the drawings.

In FIG. 2, the signal from the first signal connector 77 is outputted to the first control unit 501, and the signal from the second signal connector 78 is outputted to the second control unit 502. However, the signal from the first signal connector 77 may be outputted to both of the first control unit 501 and the second control unit 502. Similarly, the signal from the second signal connector 78 may be outputted to both of the first control unit 501 and the second control unit 502.

The power terminals 751 and 761 and the ground terminals 752 and 762, and the internal signal terminal 717 are connected to the first substrate 21 and the second substrate 22 respectively.

According to the present embodiment, the power terminals 751 and 761, the ground terminals 752 and 762 and the internal signal terminal 717 which are connected to the first substrate 21 and the second substrate 22 correspond to "connection terminals". Specifically, the connection terminals according to the present embodiment are provided in the connector unit 70 having the connectors 75 to 78. As a supplement, according to the present embodiment, the "connection terminals" do not include the torque signal terminals 771, 781 and the vehicle signal terminals 772 and 782.

Figure 8:
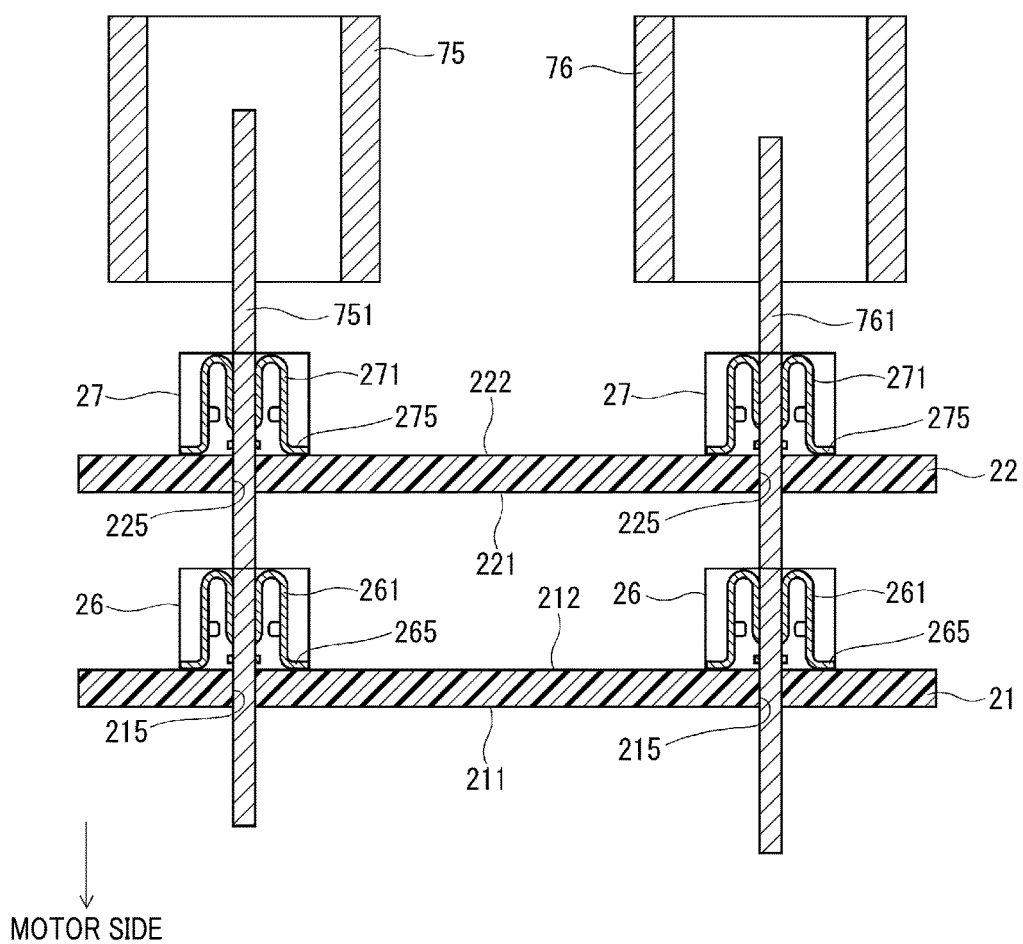
FIG. 8 is a schematic cross-sectional view showing a connection between the substrate and the connection terminal according to the first embodiment of the present disclosure.

With reference to FIG. 8, connection between the connection terminal and the substrates 21 and 22 will be described. In FIG. 8, as the connection terminal, the power terminals 751 and 761 of the power supply connector 751 and 761 are exemplified. Since detailed connection for the power terminals 751 and 761, and the substrates 21 and 22 are similar, the power terminal 751 will be mainly described.

The power terminal 751 extends towards the motor 110 side in a region where the substrate 21 and the substrate 22 are overlapped when being projected in the axial direction. The power terminal 751 is inserted into a connection terminal insertion hole 215 formed in the first substrate 21 and a connection terminal insertion hole 225 formed in the second substrate 22. Thus, the power terminal 751 penetrates the substrates 21 and 22. It should be noted that the power terminal 751 is not required to penetrate the substrate 21 which is far side from the connector forming portion 715.

The spring terminal 26 is formed outside the connection terminal insertion hole 215 of the first substrate 21. The spring terminal 27 is formed outside the connection terminal insertion hole 225 of the first substrate 21. The spring terminals 26 and 27 are formed with a conductive material such as copper to have a size corresponding to a size of the terminal to be inserted thereto. The spring terminal 26 includes an insertion portion 261 and a substrate connecting portion 265. The spring portion 27 includes an insertion portion 271 and a substrate connecting portion 275.

The insertion portion 261 is formed on a second surface 212 of the first substrate 21, standing perpendicular to the second surface 212 in a direction opposite to the motor side. The substrate connecting portion 265 is electrically connected, on the second surface 212, to a wiring pattern of the first substrate 21 which is related to the terminal to be inserted. The insertion portion 271 is formed on a second surface 222 of the second substrate 22, standing perpendicular to the second surface 222 in a direction opposite to the motor side. The substrate connecting portion 275 is electrically connected, on the second surface 222, to a wiring pattern of the second substrate 22 which is related to the terminal to be inserted.

The power terminal 751 is inserted into the insertion portions 261 and 271. The insertion portions 261 and 271 are elastically-deformed by inserting the power terminal 751 to come into contact with the power terminal 751. Thus, the power terminal 751 is electrically connected to the substrates 21 and 22.

According to the present embodiment, the power terminal 751 is inserted into the spring terminals 26 and 27 to be disposed perpendicularly relative to the substrates 21 and 22. It should be noted that term "perpendicularly" is not limited to the angle formed between the substrates 21 and 22 and the power terminal 751 being 90 degrees, but has an inclination tolerance due to the elastic deformation of the spring terminals 26 and 27, or a design error.

A single power terminal 751 is inserted into the spring terminals 26 and 27 provided on respective substrates 21 and 22, thereby being connected to the substrates 21 and 22. Accordingly, the connection terminal transmits the same signal through the substrates 21 and 22. Moreover, the connection terminal and the spring terminals 26 and 27 come into contact by elastic deformation of the spring terminals 26 and 27, so as to allow electrical connection therebetween. Thus, a manufacturing process, such as soldering, for connecting the connection terminal and the substrates 21 and 22 can be removed.

Similarly, the ground terminals 752 and 762 and the internal signal terminal 717 which are not shown, other than the power terminals 751 and 761 are also inserted into the spring terminals 26 and 27 provided on respective terminals, whereby the ground terminals 752 and 762 and the internal signal terminal 717 are electrically connected to the substrates 21 and 22 (see FIG. 4).

As shown in FIG. 4, the torque signal terminals 771 and 781, and a terminal insertion hole (not shown) to which the vehicle signal terminals 772 and 782 inserted are formed in the second substrate 22. Also, the spring terminal 27 is formed in the second surface 222 side which is outside the terminal insertion hole. The signal terminals 771, 772, 781 and 782 are inserted into the spring terminal 27, thereby being electrically connected to the second substrate 22. Thus, the microprocessors 51 and 52, and the integrated circuits 56 and 57 mounted on the second substrate 22 are able to utilize the signals transmitted from the signal terminals 771, 772, 781 and 782.

The drive apparatus 1 of the present embodiment is provided in an electric power steering apparatus 108. Since the electric power steering apparatus 108 controls a running direction of the vehicle which is important function of the vehicle, the electric power steering apparatus 108 has a redundant configuration such that a steering assist function is maintained even if a malfunction occurs in a part of the configuration. On the other hand, considering an expansion of the vehicle cabin and improving fuel efficiency, the size of the drive apparatus is required to be small.

According to the present embodiment, a redundant configuration of the circuit is produced such that a plurality of substrates 21 and 22 are provided. Specifically, to prevent a wiring space from increasing, the substrates 21 and 22 are stuck within the motor silhouette to be overlapped perpendicularly with respect to the virtual line which is an extended axial direction of the motor 10. The term "perpendicularly" is not necessarily strictly perpendicular, but tolerates small assembly errors. The connection terminals penetrate the substrates 21 and 22 in an overlapped region so as to electrically connect the substrates 21 and 22 therethrough. In other words, the connection terminals penetrate the substrates 21 and 22, thereby enabling electrical connection with the first substrate 21 other than the second substrate 22 located in connectors 75 to 78 side.

Thus, an increase of the wiring space due to the redundant configuration can be avoided. Also, a configuration is implemented in which the connection terminals are formed to be substantially straight, penetrating the substrates 21 and 22, thereby shortening the terminals. As a result, wiring impedance can be reduced.

As described above, the drive apparatus 1 according to the present embodiment is provided with the plurality of substrates 21 and 22, the connector 75 to 78, and terminals 751, 752 and 761 serving as the connection terminals.

The motor 110 has a plurality of winding groups, that is, the windings 11 and the windings 12.

The substrates 21 and 22 are provided at one side of the motor 110 in the axial direction, substrates including the SW elements 301 to 306, 401 to 406 serving as a conduction switch of the windings 11 and 12, and control components related to the driving control of the motor 110, mounted thereon. The control components of the present embodiment include the microprocessor 51 and 52, and the integrated circuits 56 and 57.

The connectors 75 to 78 are provided in the opposite side of the motor 110 across the substrates 21 and 22. The power terminals 751 and 761, the ground terminals 752 and 762, and the internal signal terminal 717 are connected to the substrates 21 and 22.

The substrates 21 and 22 are arranged such that at least a part of the substrates are overlapped when the substrates are projected in the axial direction of the motor 110, and when viewing from the axial direction. Here, a region in which the substrates 21 and 22 are projected is referred to as an overlapped region. The terminals 751, 752, 761, 762 and 717 penetrate at least a part of substrates 21 and 22 so as to connect the substrates 21 and 22 in the overlapped region.

According to the present embodiment, since one connection terminal is connected to the substrates 21 and 22, the same information can be transmitted to the substrates 21 and 22. The same information includes, in addition to general signals, power lines and ground lines connected to the batteries 39 and 49.

Also, a connection portion where the connection terminals and the substrates 21 and 22 is provided in the overlapped region, whereby an increase of a wiring space can be avoided. As a result, compared to a case where the wiring space for wirings and terminals is provided in a portion other than the overlapped region, a size of the drive apparatus, especially the size in the radial direction of the drive apparatus can be prevented from being increased.

According to the present embodiment, two substrates are provided in which a substrate in the motor 110 side is referred to as the first substrate 21 and a substrate in the connectors 75 to 78 side is referred to as the second substrate 22.

The SW elements 301 to 306, and 401 to 406 are mounted on the first surface 11 which is a surface of the motor 110 side in the first substrate 21, and arranged to be capable of radiating heat to the frame 18 that forms an outline of the motor 110 in one side thereof in the axial direction.

The microprocessors 51 and 52 and the integrated circuits 56 and 57 are mounted on the second substrates 22.

According to the present embodiment, since the frame 18 is used as a heat sink, compared to the case where dedicated heat sink is provided, the number of components can be reduced and a heat transfer path to atmosphere can be shortened.

Moreover, the first substrate 21 serves as a power substrate and the second substrate 22 serves as a control substrate. In other word, a power unit, which is likely to be a noise source because of the large amount of current flowing therethrough, is isolated from the control unit. Thus, the control component is prevented from being influenced by noise.

The substrates 21 and 22 include the spring terminals 26 and 27 respectively. According to the present embodiment, the spring terminal 26 is provided on the first substrate 21 and the spring terminal 27 is provided on the second substrate 22.

The spring terminal 26 includes the insertion portion 261 and the substrate connecting portion 265. The insertion portion 261 is capable of being elastically deformed by inserting the terminal, and comes into contact with the terminal. The substrate connecting portion 265 is electrically connected to the first substrate 21.

The spring terminal 27 includes the insertion portion 271 and the substrate connecting portion 275. The insertion portion 271 is capable of being elastically deformed by inserting the terminal, and comes into contact with the terminal. The substrate connecting portion 275 is electrically connected to the second substrate 22.

The power terminals 751 and 761, the ground terminals 752 and 762, and the internal signal terminal 717 contact with the spring terminals, as being inserted into the spring terminals 26 and 27 provided on the substrates 21 and 22. As a result, these terminals are connected to the plurality of substrates 21 and 22.

Accordingly, the connection terminal is inserted into the spring terminal, whereby the connection terminal can readily be connected to the substrates 21 and 22. Also, a manufacturing process such as soldering for electrically connecting the connection terminal and the substrates 21 and 22 can be omitted.

The first substrate 21 provided in a portion proximate to the motor 110 is provided with a rotation sensor 60 that detects rotation of the motor 110. According to the present embodiment, the rotation sensor 60 includes a plurality of sensors 61 and 62 that detects a rotational angle of the motor 110. The plurality of sensors 61 and 62 are provided on the first surface 211 which is a surface facing the motor 110 of the first substrate 21. Accordingly, rotation of the motor 110 can be accurately detected.

The connection terminal includes the power terminals 751 and 761 that connect the batteries 39 and 49 with the substrates 21 and 22, and the ground terminals 752 and 762 that connect the ground and the substrates 21 and 22. Hence, substrates 21 and 22 can be powered appropriately. The connection terminal includes the internal signal terminal 717 used for transmitting a signal between the substrates 21 and 22.

Also in the case where all of the connection terminals in the drive apparatus 1 are the internal signal terminals 717, the concept where "connection terminal includes internal signal terminal" is applied. Similarly, in the case where the connection terminals are not the internal signal terminal, the concept where "connection terminal includes internal signal terminal" is applied. According to the present embodiment, the internal signal terminal 717 is used for transmitting the detection value of the rotation sensor 60. The internal signal terminal 717 is provided so that signal transmission between the substrates 21 and 22 can be accomplished.

The electric power steering apparatus 108 according to the present embodiment is provided with the drive apparatus 1 and the reduction gear 109. The reduction gear 109 transmits the power of the motor 110 to the column shaft 102, where the motor 110 outputs an auxiliary torque that assists steering of the steering wheel 101 operated by the driver.

The drive apparatus 1 is adapted for the electric power steering apparatus 108, whereby an increase of the wiring space can be avoided even in a configuration in which a plurality of connectors and substrates are provided. As a result, both of a downsizing and a redundant configuration can be accomplished.

Second Embodiment

Figure 9:
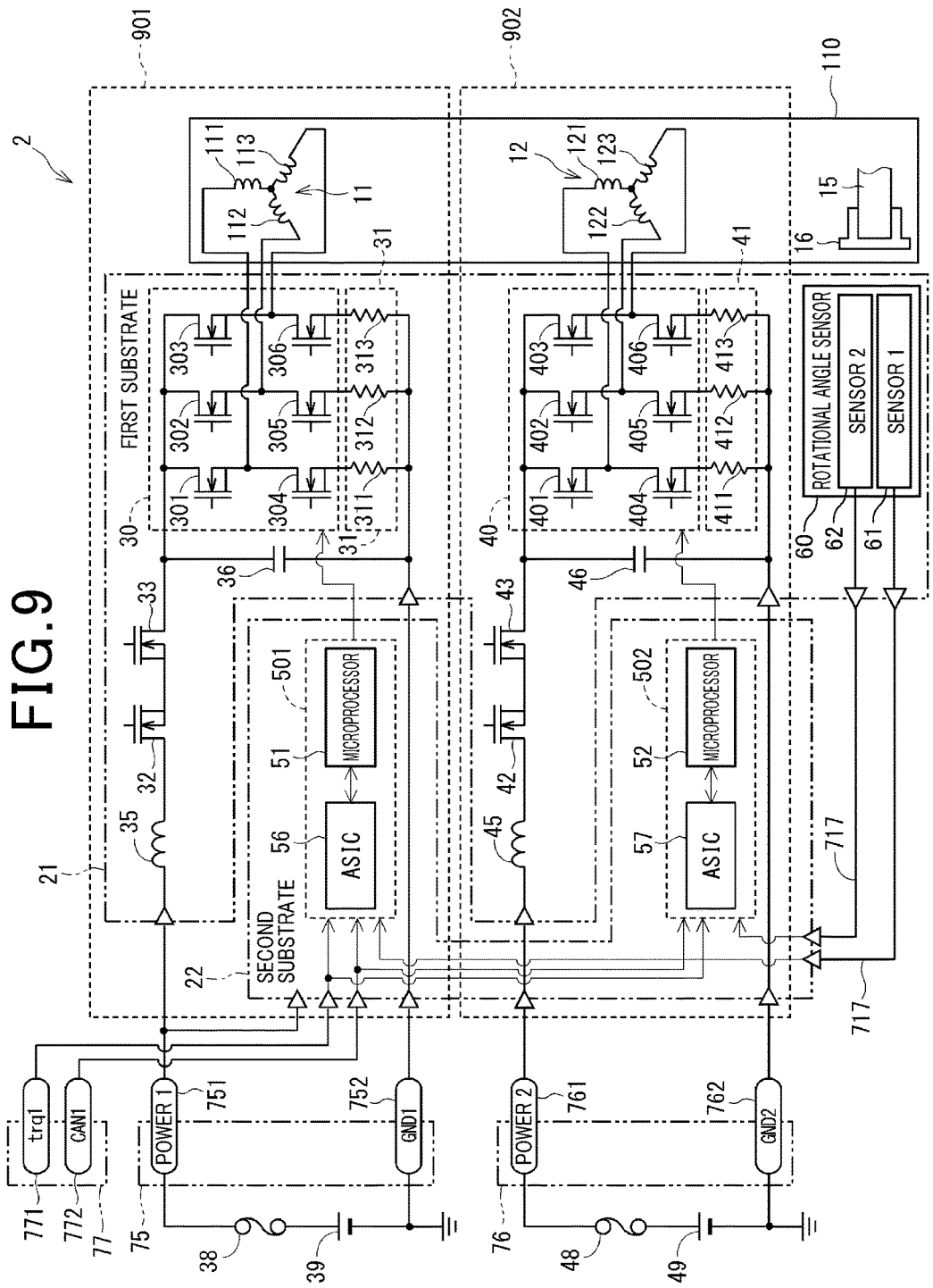
FIG. 9 is a circuit diagram showing a drive apparatus according to a second embodiment of the present disclosure.

With reference to FIG. 9, the second embodiment of the present disclosure will be described.

The drive apparatus according to the second embodiment differs from the above-described embodiment in that the second signal connector 78 is omitted and one signal connector 77 is provided. The signal transmitted through the signal connector 77 is used for the first control unit 501 and the second control unit 502. According to the second embodiment, similar to the above-described embodiment, the power terminals 751 and 761, and the ground terminals 752 and 762 of the power supply connectors 75 and 76, and the internal signal terminal 717 correspond to the connection terminals. The connection between respective terminals and the first substrate 21 and the second substrate 22 is also similar to the above-described embodiment. According to this configuration, similar effects to the above-described embodiment can be obtained.

Third Embodiment

Figure 10:
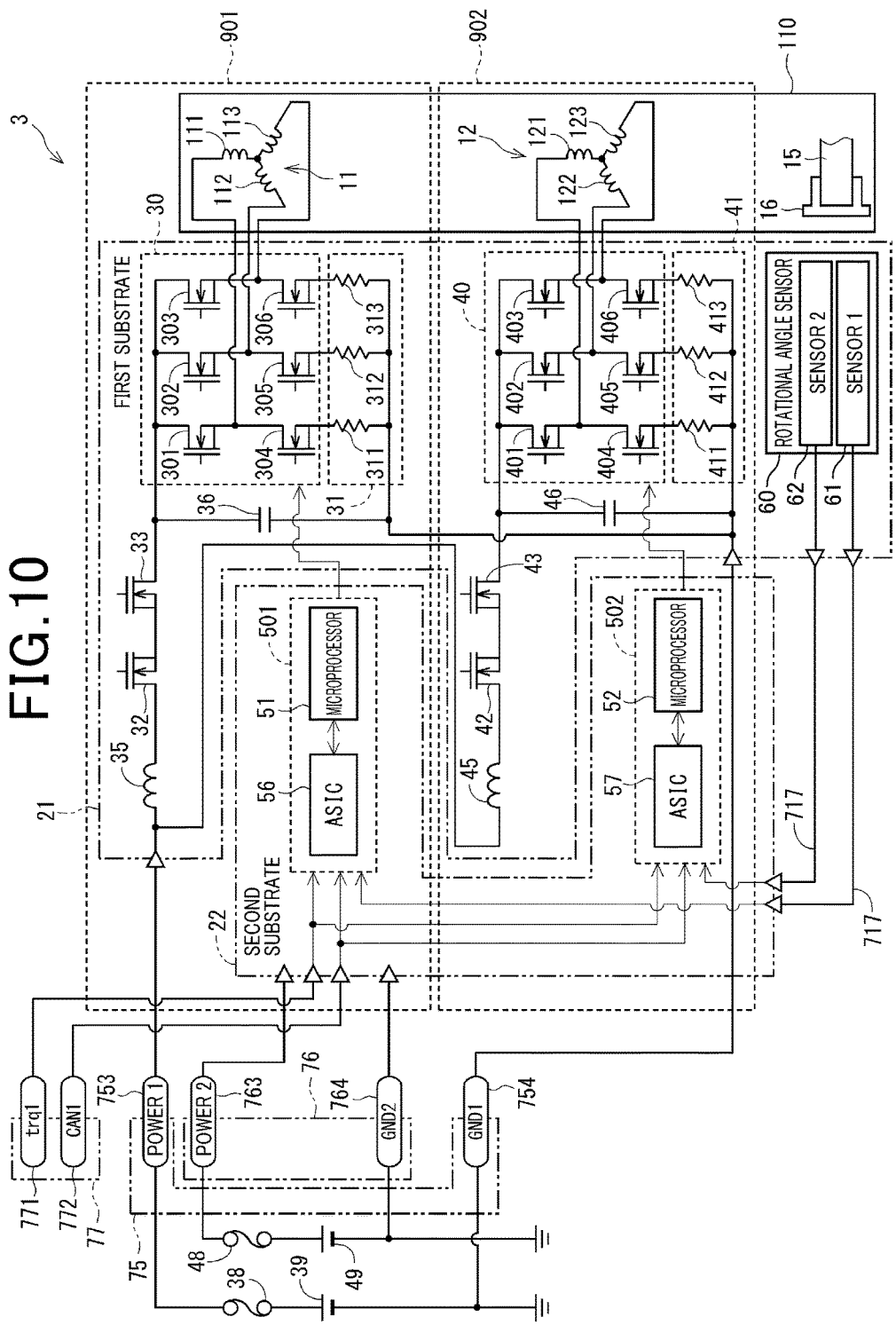
FIG. 10 is a circuit diagram showing a drive apparatus according to a third embodiment of the present disclosure.
Figure 11:
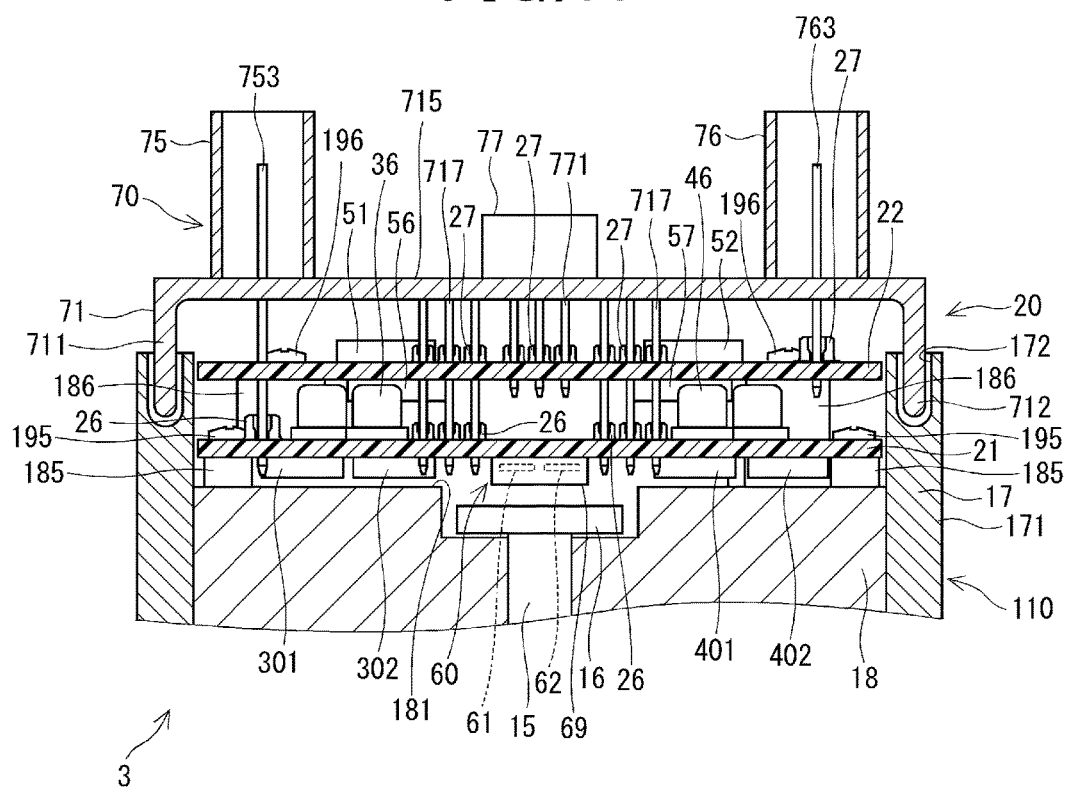
FIG. 11 is a cross-sectional view showing the drive apparatus of the third embodiment of the present disclosure.

With reference to FIGS. 10 and 11, the third embodiment of the present disclosure will be described. FIG. 11 is a cross-sectional view corresponding to FIG. 4 of the first embodiment. Also, FIGS. 14, 16 and 21 which will be described later are similar. The drive apparatus 3 of the present embodiment is similar to the second embodiment, in which the second signal connector 78 is omitted and single signal connector 77 is provided.

In the drive apparatus 3 according to the third embodiment, similar to the second embodiment, the second signal connector 78 is omitted, and single signal connector 77 is provided.

Moreover, according to the third embodiment, the first power supply connector 75 is connected to the first substrate 21 and not connected to the second substrate 22. The second power supply connector 76 is connected to the second substrate 22 and not connected to the first substrate 21. According to the third embodiment, the power connectors 75 and 76 are provided for the substrates 21 and 22. In other words, the first battery 39 is connected to the first substrate 21 and the second battery 49 is connected to the second substrate 22.

As shown in FIG. 11, the power terminal 753 and the ground terminal 754 of the first power connector 75 are inserted into connection terminal insertion holes (not shown) of the second substrate 22 and connection terminal insertion holes (not shown) of the second substrate 21, and penetrate the second substrate 22 and the first substrate 21. Further, spring terminals are not provided in the insertion holes of the second substrate 22 to which the terminals 753 and 754 are inserted, and the inner side surface is insulated. Similar to the first embodiment, the terminals 753 and 754, and the first substrate 21 are electrically connected by inserting the terminals 753 and 754 into the spring terminal 26. Thus, the terminals 753 and 754 are connected to the first substrate 21 and not connected to the second substrate 22.

The power terminal 763 and the ground terminal 764 of the second power connector 76 are inserted into connection terminal insertion holes (not shown) of the second substrate 22, penetrating through the second substrate 22. The tip portions of the terminals 763 and 764 are located between the first substrate 21 and the second substrate 22. In other words, the terminals 763 and 764 do not extend to the first substrate 21. Similar to the first embodiment, the terminals 763 and 764, and the second substrate 22 are electrically connected by the spring terminal 27. Thus, the terminals 763 and 764, and the second substrate 22 are connected and disconnected from the first substrate 21.

The function of the terminals 753 and 754 are the same as the terminals 751 and 752 of the above-described embodiments, except that the terminals 753 and 754 are not connected to the second substrate 22. Also, the function of the terminals 763 and 764 are the same as the terminals 761 and 762 of the above-described embodiments, except that the terminals 763 and 764 are not connected to the first substrate 21.

According to the third embodiment, the internal signal terminal 717 corresponds to "connection terminal".

According to the configuration of the third embodiment, similar effects to the above-described embodiments can be obtained.

Fourth Embodiment

Figure 12:
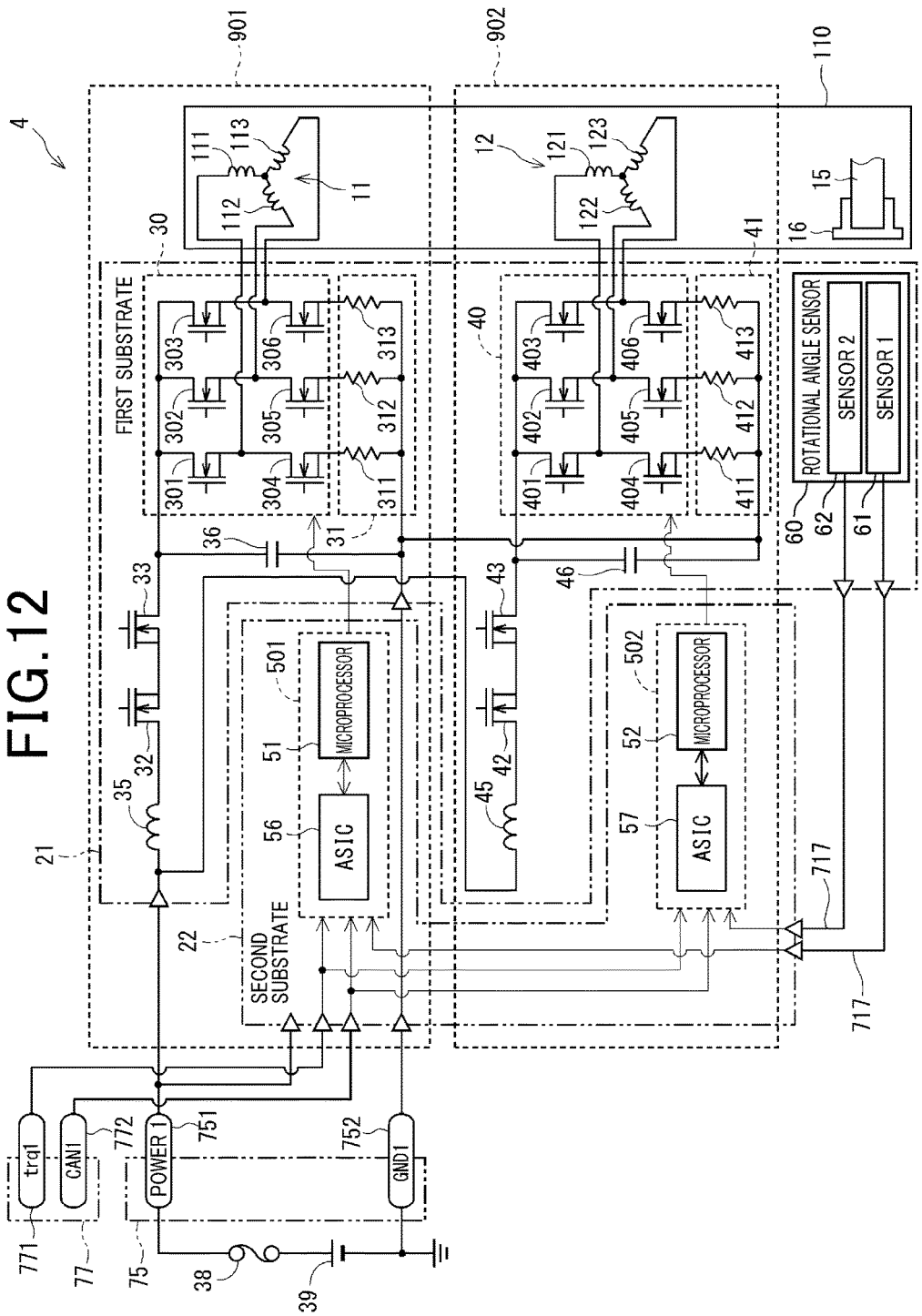
FIG. 12 is a circuit diagram showing a drive apparatus according to a fourth embodiment of the present disclosure.

With reference to FIG. 12, the fourth embodiment of the present disclosure will be described.

In the drive apparatus 4 of the fourth embodiment, the second power supply connector 76 is omitted and a single power supply connector 75 is provided. Similar to the second embodiment, a single signal connector 77 is provided.

According to the fourth embodiment, the power terminal 751 and the ground terminal 752 of the power supply connector 75, and the internal signal terminal 717 correspond to the connection terminals. The connections between the connection terminal, the first substrate 21 and the second substrate 22 are the same as the above-described embodiment.

According to the configuration of the fourth embodiment, similar effects to the above-described embodiments can be obtained.

Fifth Embodiment

Fifth embodiment and the sixth embodiment are modifications of the rotation sensor. The rotation sensors of the fifth embodiment and the sixth embodiment can be combined with any embodiments.

Figure 13:
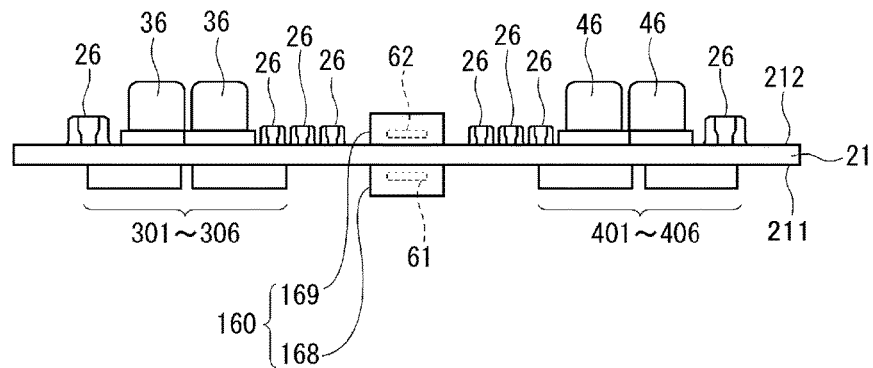
FIG. 13 is a side view showing a first substrate of a fifth embodiment of the present disclosure.

With reference to FIG. 13, the fifth embodiment of the present disclosure will be described.

In the fifth embodiment, the rotation sensor 160 differs from that of the above-described embodiments. In the rotation sensor 160, the first sensor 61 is accommodated in the first package 168, and the second sensor 62 is accommodated in the second package 169. In other words, the sensors 61 and 62 are each formed in different packages.

The first package 168 is mounted on the first surface 211 of the first substrate 21, and the second package 169 is mounted on the second surface 212 of the first substrate 21. The second package 169 may be mounted on the first surface 211 side, and the first package 168 may be mounted on the second surface side 212. The packages 168 and 169 are arranged such that the magnetic sensors of the sensors 61 and 62 are disposed on the center line of the magnet 16.

According to the fifth embodiment, the sensor 61 is mounted on the first surface 211 which is a surface in the motor 111 side of the first substrate 21, and the sensor 62 is mounted on the second surface 2121 which is a surface opposite to the motor 111.

The sensors 61 and 62 are formed in different packages and arranged on both surfaces of the first substrate 21, whereby the magnetic sensors of the sensors 61 and 62 can be disposed on the rotational axis or in a region close to the rotational axis where small detection error is expected. The sensors 61 and 62 are arranged on both sides so that a mounting area can be small and the size in the radial direction can be smaller as well. Moreover, similar effects to the above-described embodiments can be obtained.

Sixth Embodiment

Figure 14:
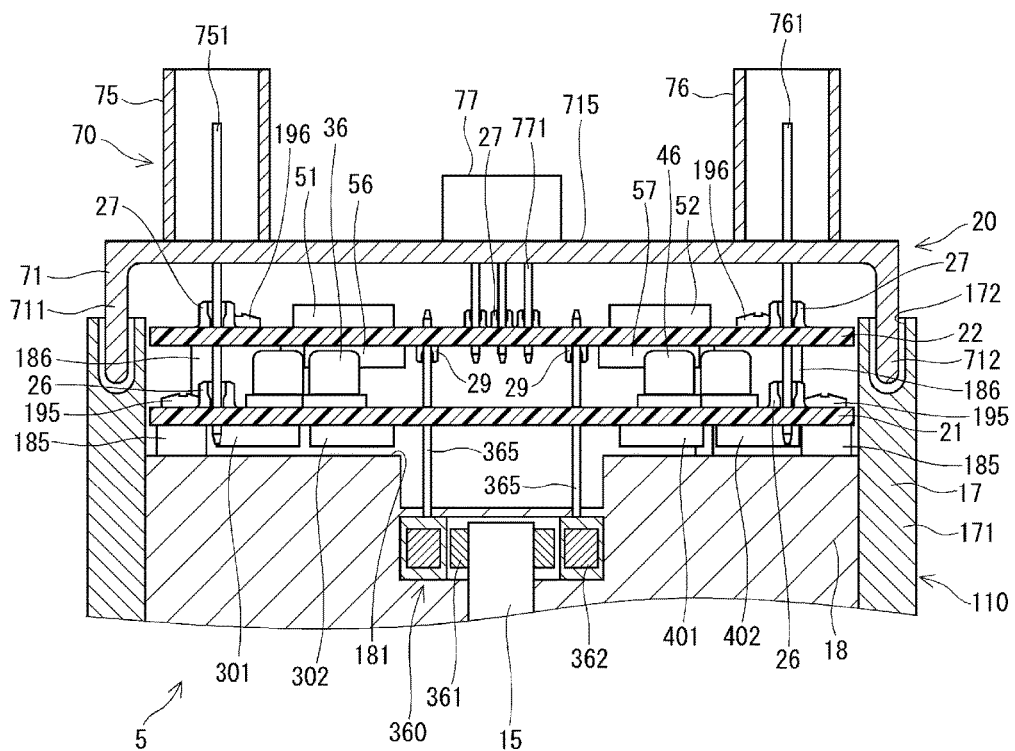
FIG. 14 is a cross-sectional view showing a drive apparatus of a sixth embodiment of the present disclosure.

With reference to FIG. 14, the sixth embodiment of the present disclosure will be described.

In the drive apparatus 5 of the present disclosure, the rotation sensor 360 is different from the above-described embodiments. Also, the internal signal terminal 717 is omitted.

The rotation sensor 360 is configured as a resolver including a resolver rotor 361, a resolver stator 362 and a resolver terminal 365 as a rotation sensor terminal. The resolver rotor 361 is fixed to the outer periphery of the shaft 15 in the radial direction, and rotates integrally with the shaft 15. The resolver stator 362 is provided at an outer side of is the resolver rotor 361.

The resolver terminal 365 serves as a terminal that transmits electrical signals produced by a change in reactance between the resolver rotor 361 and the resolver stator 362, the electrical signals being transmitted as information about rotational angle of the motor 110. The resolver terminal 365 is formed in a region where the substrates 21 and 22 are overlapped when being projected in the axial direction. The resolver terminal 365 extends substantially straight towards the connector forming portion 715 side of the cover 71 from the motor 110 side. The resolver terminal 365 is inserted into a connection terminal insertion hole (not shown) formed through the first substrate 21 and a connection terminal insertion hole (not shown) formed through the second substrate 22. Accordingly, the resolver terminal 365 penetrates through the substrates 21 and 22.

The spring terminal 29 is provided on the first surface 221 of the second substrate 22, located outside the terminal insertion hole of the second substrate 22, through which the resolver terminal 365 is inserted. The spring terminal 29 is configured similar to the spring terminal 26 or the like, such that the resolver terminal 365 is inserted through the spring terminal 29, whereby the resolver terminal 365 and the second substrate 22 are connected. Thus, the microprocessors 51 and 52 and the integrated circuits 56 and 57 are able to utilize the output signal from the resolver terminal 365.

According to the sixth embodiment, the resolver terminal 365 and the first substrate 21 are not electrically connected. In other words, the spring terminal is not provided in the terminal insertion hole of the first substrate 21 through which the resolver terminal 365 is inserted, so that the resolver terminal 365 and the first substrate 21 are isolated. In the case where the information about the rotation angle is used in the first substrate 21, the spring terminal 29 is provided on the first surface 211 of the first substrate 21, and the resolver terminal 365 is inserted through the spring terminal 29, whereby the resolver terminal 365 and the first substrate 21 are electrically connected. In the case where the resolver terminal 365 is connected to the first substrate 21 and the second substrate 22, the resolver terminal 365 can be regarded as "connection terminals".

According to the sixth embodiment, the rotation sensor 360 is provided in the motor 110 to detect the rotation. The rotation sensor 360 penetrates through a part of the substrates 21 and 22 in the overlapped region. The rotation sensor 360 includes a resolver terminal 365 on the second substrate 22 which is a substrate other than the first substrate 21 disposed proximate to the motor 110 side. Thus, without increasing a wiring space for connecting the rotation sensor 360 with the second substrate 22, the rotation sensor 360 and the second substrate 22 can be connected so that the detection value of the rotation sensor 360 can be properly transmitted to the second substrate 22.

According to the sixth embodiment, the first substrate 21 corresponds to a motor side substrate. Also, similar effects to the above-described embodiments can be obtained.

Seventh Embodiment

Figure 15:
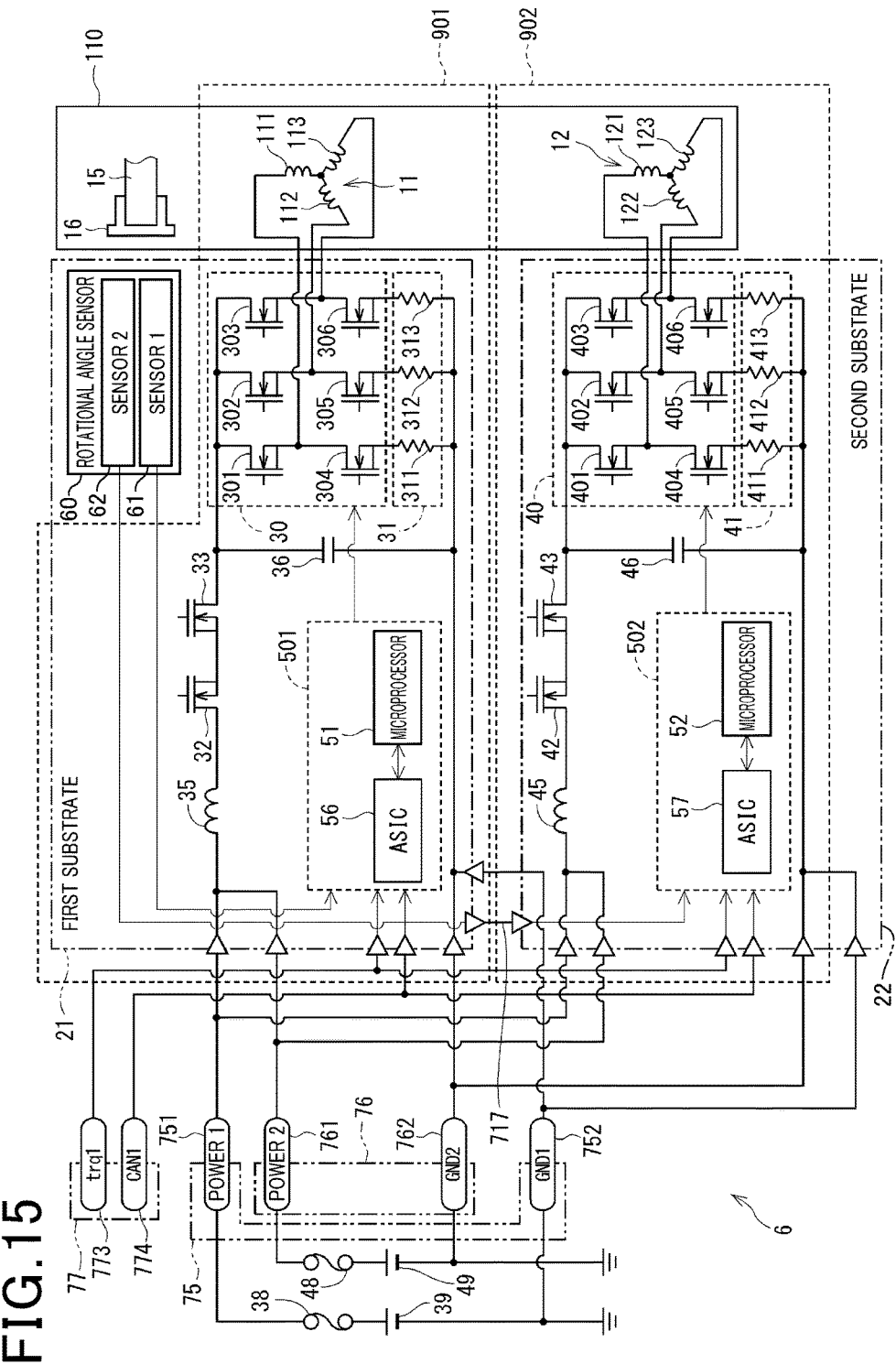
FIG. 15 is a circuit diagrams showing a drive apparatus of a seventh embodiment of the present disclosure.
Figure 16:
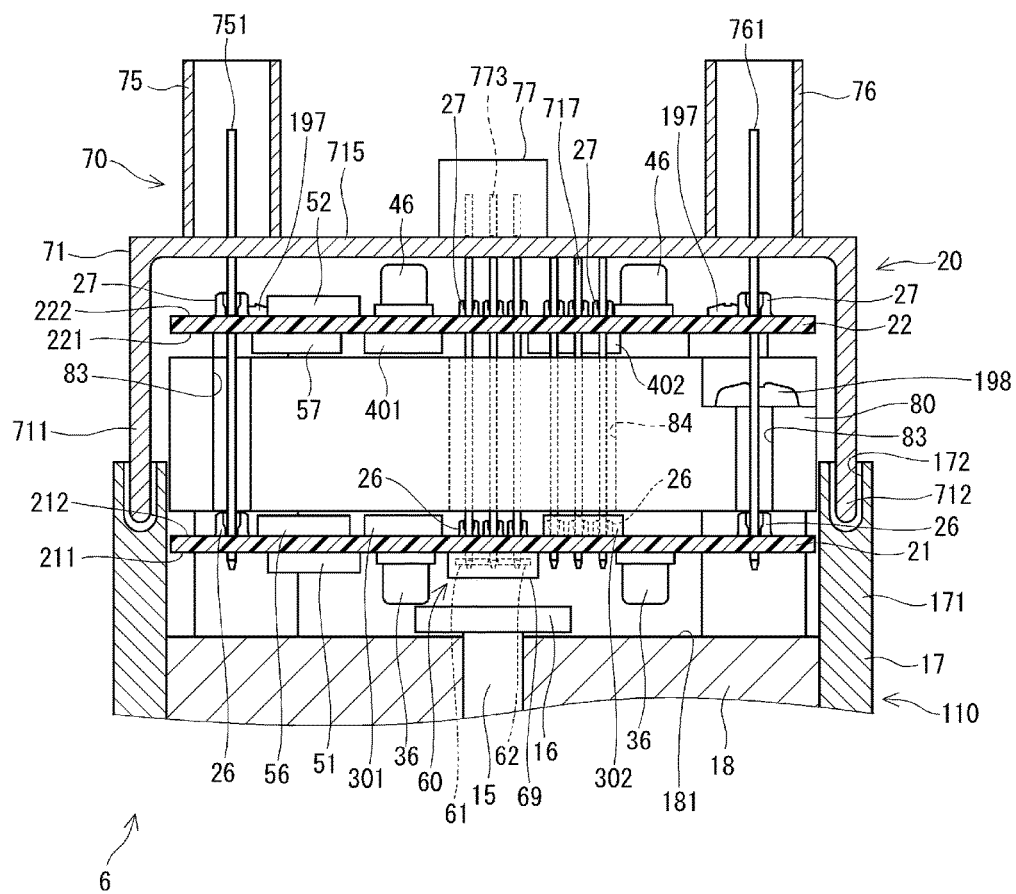
FIG. 16 is a cross-sectional view showing the drive apparatus according to the seventh embodiment of the present disclosure.
Figure 17:
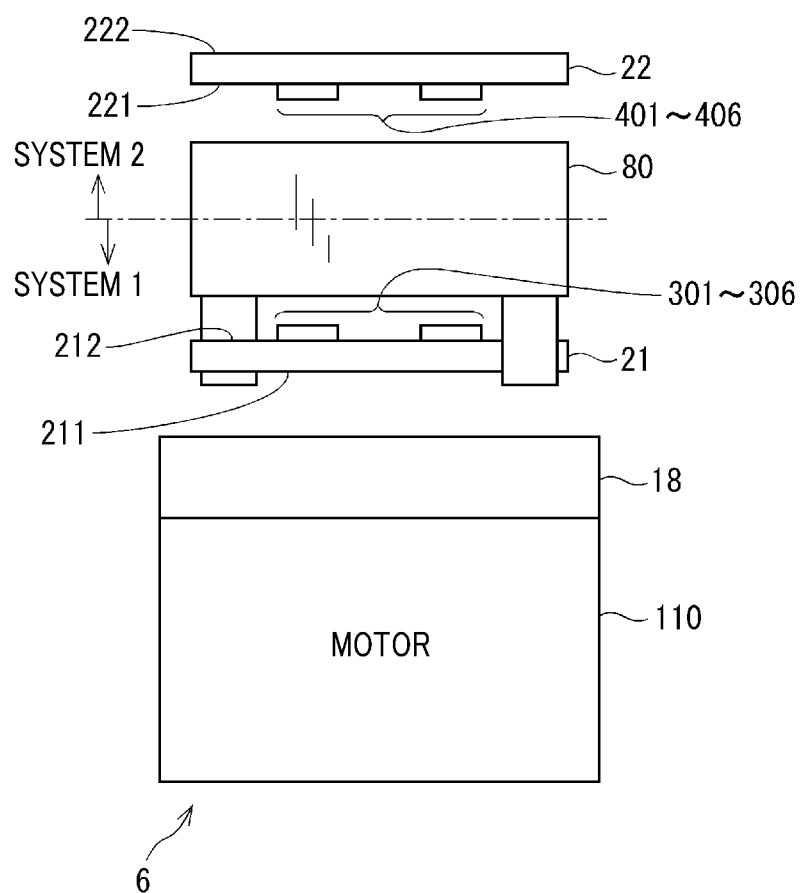
FIG. 17 is a schematic side view showing an arrangement of systems of the drive apparatus according to the seventh embodiment of the present disclosure.

With reference to FIGS. 15 to 17, the seventh embodiment of the present disclosure will be described. In the cross-sectional view shown in FIG. 16, hatching of the heat sink 80 is omitted for convenience of explanation. Similarly, hatching of the heat sink 80 is omitted in FIG. 21.

As shown in FIG. 15, the drive apparatus 6 according to the seventh embodiment, electronic components related to the first system 901 and the rotation sensor 60 are mounted on the first substrate 21, and electronic components related to the second system 902 is mounted on the second substrate 22. Specifically, the SW elements 301 to 306, the current detectors 311 to 313, the first choke coil 35, the first capacitor 36, the first microprocessor 51, the first integrated circuit 56 and the rotation sensor 60 are mounted on the first substrate 21. The SW elements 401 to 406, the current detectors 411 to 413, the second choke coil 45, the second capacitor 46, the second microprocessor 52 and the second integrated circuit 57 are mounted on the second substrate 22. In other words, according to the seventh embodiment, the power circuit portion and the control circuit portion are not isolated so that power input/output lines related to the power supplied from the battery and signal lines used for transmitting the control signals or the like are mixed in the power the substrates 21 and 22.

According to the seventh embodiment, the motor lines connected to the first winding 11 are connected to the first substrate 21, and the motor lines connected to the second windings 12 are connected to the second substrate 22.

As shown in FIG. 16, the heat sink 80 is provided between the first substrate 21 and the second substrate 22. The heat sink 80 is formed by a material such as aluminum having good thermal conductivity. The first substrate 21 is fixed to the motor 110 side of the heat sink 80 by a screw (not shown) or the like. The substrate 22 is fixed to opposite side of the motor 110 of the heat sink 80 by a screw 197. In other words, the substrates 21 and 22 are fixed to respective sides of the heat sink 80. The heat sink 80 is fixed to the frame 18 by a heat sink fixing screw 198 under a state where the substrates 21 and 22 are fixed.

The first choke coil 35, the first capacitor 36, the first microprocessor 51, and the rotation sensor 60 are mounted on the first surface 21 of the first substrate 21. The SW elements 301 to 306, the current detectors 311 to 313, and the first integrated circuit 56 are mounted on the second surface 212 of the first substrate 21. The SW elements 401 to 406, the current detectors 411 to 413, and the second integrated circuit 57 are mounted on the first surface 211 of the second substrate 22. The second choke coil 45, the second capacitor 46 and the second microprocessor 52 are mounted on the second surface of the second substrate 22.

The SW elements 301 to 306 and 401 to 406 are provided to be capable of radiating heat to the heat sink 80. In addition to the SW elements 301 to 306 and 401 to 406, the current detectors 311 to 313 and 411 to 413 and the integrated circuits 56 and 57 may be provided at the heat sink 80 to be capable of radiating heat. According to the seventh embodiment, the frame 18 does not serve as a heat sink.

According to the seventh embodiment, the substrates 21 and 22 are provided on both sides of the heat sink 80 in the axial direction, allowing heat produced by the SW elements 301 to 306, and 401 to 406 to radiate through the heat sink 80. Therefore, heat produced by the first system 901 and the second system 902 are unlikely to influence each other. The heat produced by the SW elements 301 to 306 and 401 to 406 is radiated from the same heat sink 80 so that difference of radiated heat between the systems can be smaller. Further, since circuit configurations of the two systems including heat radiation structures can be separated from the motor 110, various tests can be performed for the circuit configurations separately from the motor 110.

According to the seventh embodiment, similar to the second embodiment, the second signal connector 78 is omitted and single signal connecter 77 is provided.

In the signal connecter 77, a torque signal terminal 773 that accepts signal from the torque sensor 103, and a vehicle signal terminal 774 (not shown in FIG. 16) that accepts a CAN signal are formed. The signal terminals 773 and 774 according to the seventh embodiment are formed extending to the first substrate 21.

In the heat sink 80, a power terminal insertion portion 83 is formed. The power terminal insertion portion 83 communicates between the motor 110 side of the heat sink 80 and the connector forming portion 715 of the cover 71. The power terminal insertion portion 83 is formed at a corresponding portion in the first power connectors 751 and 752, and the second power connectors 761 and 762, where the terminals 751, 752, 761 and 762 are inserted. Hence, the terminals 751, 752, 761 and 762 are formed extending to a portion of the heat sink 80 in which the first substrate 21 is formed.

The heat sink 80 includes a signal terminal insertion portion 84. The signal terminal insertion portion 84 communicates the motor 110 side of the heat sink 80 and the connector forming portion 715 of the cover 71. The signal terminal insertion portion 84 is formed at a corresponding portion in the signal terminals 773 and 774 of the signal connector 77, and the internal signal terminal 717, where the terminals 773, 774 and 717 are inserted. Hence, the terminals 773, 774, and 717 are formed extending to a portion of the heat sink 80 in which the first substrate 21 is formed. In FIG. 16, the signal terminals 773 and 774, and the internal signal terminal 717 are inserted to the same signal terminal insertion portion. However, the signal terminal insertion portion 84 is provided depending on terminal arrangement or the like, for example, separately providing the signal terminal insertion portion to which the internal signal terminal 717 is inserted.

According to the seventh embodiment, in addition to the terminals 751, 752, 761 and 762 of the power supply connectors 75 and 76 and the internal signal terminal 717, the terminals 773 and 774 of the signal connector 77 are electrically connected the first and second substrates 21 and 22 using the spring terminals 26 and 27. In other words, according to the seventh embodiment, the terminals 751, 752, 761, 762, 773, 774 and 717 correspond to "connection terminals". The detailed configuration of connection between the connection terminal and the substrates 21 and 22 using the spring terminals 26 and 27 is similar to that of the above-described embodiments.

Accordingly, a signal from the torque sensor 103 and a signal via the CAN can be utilized by the first microprocessor 51 and the first integrated circuit 56 mounted on the first substrate 21, and the second microprocessor 52 and the second integrated circuit 57 mounted on the second substrate 22. According to the seventh embodiment, the torque sensor 103 and the CAN correspond to "external member", and the torque signal terminals 773 and 783 and the vehicle signal terminals 774 and 784 correspond to "external signal terminal".

According to the seventh embodiment, the heat sink 80 is provided between the first substrate 21 and the second substrate 22. The first substrate 21 includes a plurality of SW elements 301 to 306, the first microprocessor 51 and the first integrated circuit 56 mounted thereon. The second substrate 22 includes a plurality of SW elements 401 to 406, the second microprocessor 52 and the second integrated circuit 57 mounted thereon.

The SW elements 301 to 306, 401 to 406 are mounted on the substrates 21 and 22 to face the heat sink 80.

Accordingly, heat produced by the SW elements 301 to 306, 401 to 406 can be appropriately radiated to the heat sink 80.

A plurality of winding groups are provided including the first winding 11 and the second winding 12.

The first substrate 21 includes the SW elements 301 to 306 related to a conduction control of one winding group (i.e., the windings 11), the first microprocessor 51 and the first integrated circuit 56 mounted thereon.

The first substrate 21 includes the SW elements 301 to 306 related to a conduction control of one winding group (i.e., the windings 11), the first microprocessor 51 and the first integrated circuit 56 mounted thereon.

The second substrate 22 includes the SW elements 401 to 406 related to a conduction control of the other winding group (i.e., the windings 12), the first microprocessor 52 and the first integrated circuit 57 mounted thereon.

According to the seventh embodiment, components related to the first system 901 are mounted on the first substrate 21, and components related to the second system 902 are mounted on the second substrate 22, so that respective substrates 21 and 22 are dedicated for each system. Thus, even if any abnormality occurs on one substrate, the drive control of the motor 110 can be maintained on the other substrate. Moreover, each of the substrates is provided facing respective sides of the heat sink 80, so that heat propagated from other system is likely to be blocked.

The connection terminal includes the signal terminals 773, 774, 783 and 784 allowing an external signal to transmit to the substrates 21 and 22. Thus, an external signal can be appropriately transmitted to the substrates 21 and 22. Also, similar effects to the above-described embodiments can be obtained.

Eighth Embodiment

Figure 18:
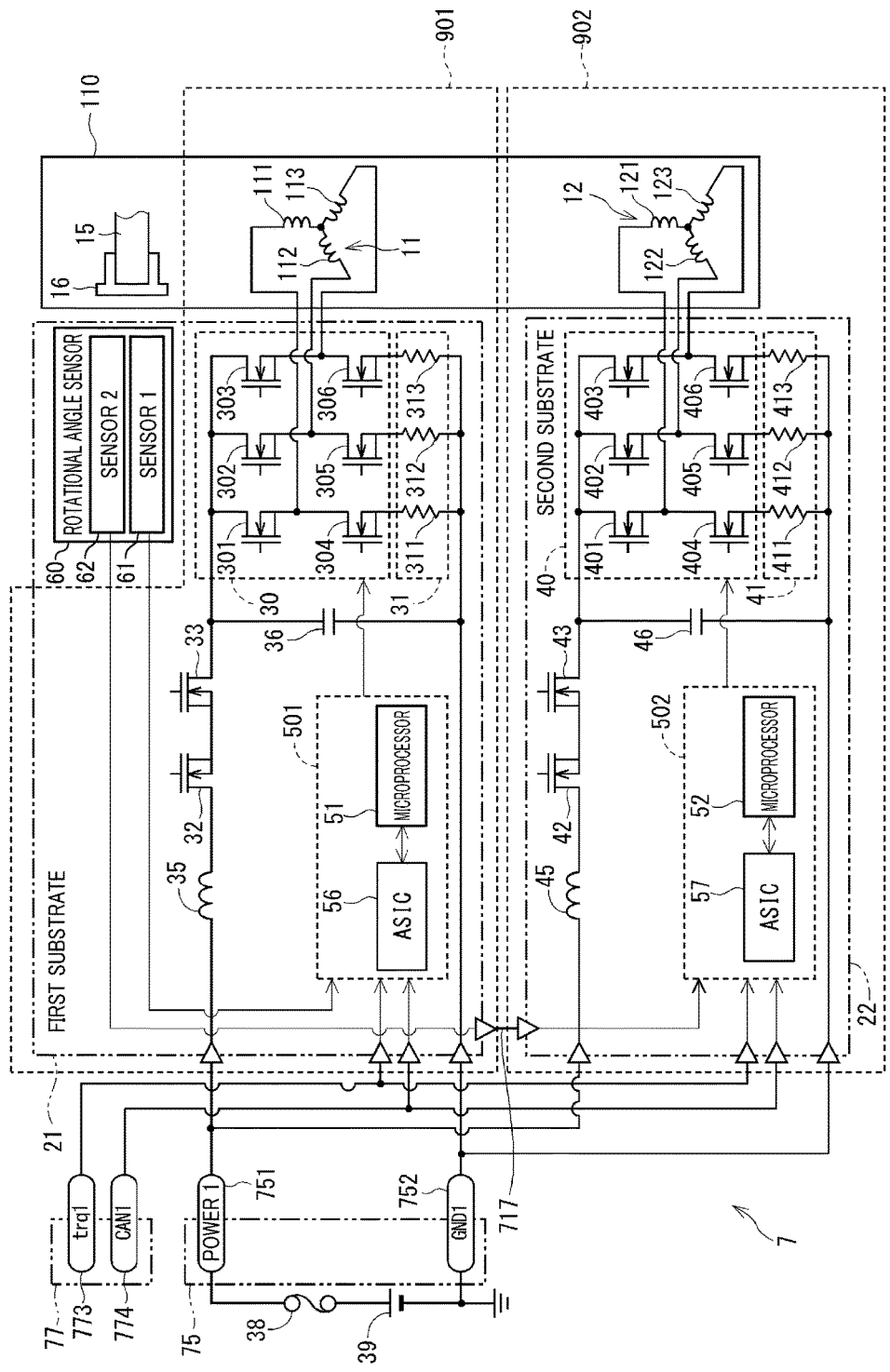
FIG. 18 is a circuit diagram showing a drive apparatus according to an eighth embodiment of the present disclosure.

With reference to FIG. 18, the eighth embodiment of the present disclosure will be described.

The drive apparatus 7 of the eighth embodiment differs from the seventh embodiment in that the second power supply connector 76 is omitted and single power supply connector 75 is provided.

According to the eighth embodiment, the power terminal 751 and the ground terminal 752 of the power connector 75, the torque signal terminal 773 and the vehicle signal terminal 774 of the signal connector 77, and the internal signal terminal 717. The connections between the connection terminal and the substrates 21 and 22 are similar to that of the above-described embodiments. Similar effects to the above-described embodiments can be obtained from the configuration of the eighth embodiment.

Ninth Embodiment

Figure 19:
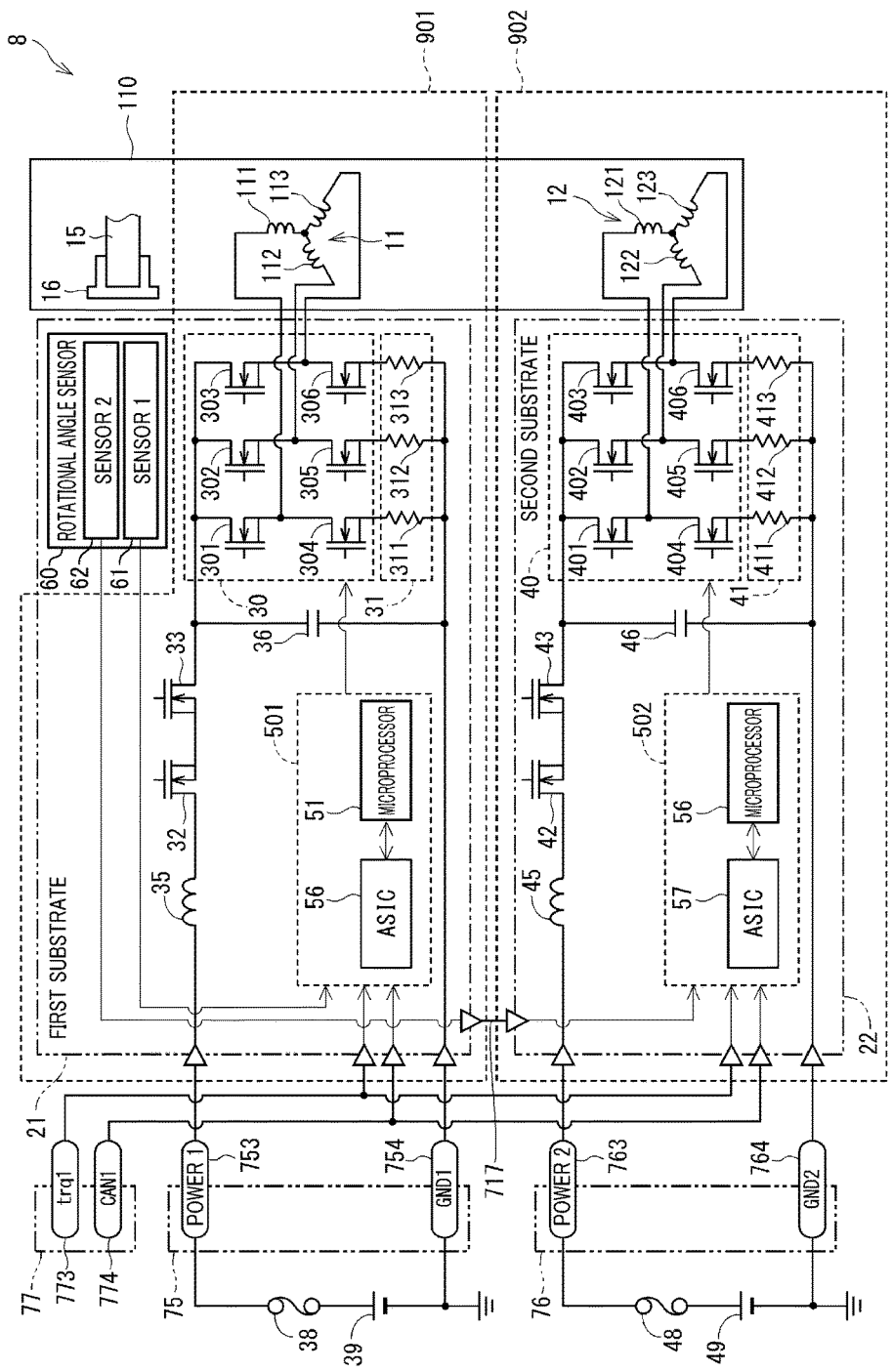
FIG. 19 is a circuit diagram showing a drive apparatus according to a ninth embodiment of the present disclosure.

With reference to FIG. 19, the ninth embodiment of the present disclosure will be described.

The drive apparatus 8 of the ninth embodiment is similar to the third embodiment, in which the first power supply connector 75 is connected to the first substrate 21 and not connected to the second substrate 22. The second power supply connector 76 is connected to the second substrate 22 and not connected to the first substrate 21. In other words, according to the ninth embodiment, the power supply connectors 75 and 76 are provided for every substrate 21 and the substrate 22. Specifically, the first battery 39 is connected to the first substrate 21 and the second battery 49 is connected to the second substrate 22. According to the ninth embodiment, since electronic components related to the first system 901 are mounted on the first substrate 21 and electronic components related to the second system 902 are mounted on the second substrate 22, the first battery 39 is provided corresponding to the first system 901, and the second battery 49 is provided for the second system 902.

According to the ninth embodiment, similar to the third embodiment, the spring terminals are not provided for the terminal insertion holes of the second substrate 22 to which the power terminal 753 and the ground terminal 754 of the first power supply connector 75 (see FIG. 11). Also, the terminals 753 and 754, and the second substrate 22 are isolated.

As described above, according to the ninth embodiment, the first battery 39 is provided for the first system 901, and the second battery 49 is provided for the second system 902. Hence, even when abnormality occurs on the power system, the systems 901 and 902 are prevented from occurring abnormality.

The signal terminals 773, 774 and 717 are connected to the first substrate 21 and the second substrate 22 by the spring terminals 26 and 27. According to the ninth embodiment, the signal terminals 773, 774 and 717 correspond to "connection terminal". Similar effects to the above-described embodiments can be obtained from the configuration of the ninth embodiment.

Tenth Embodiment

Figure 20:
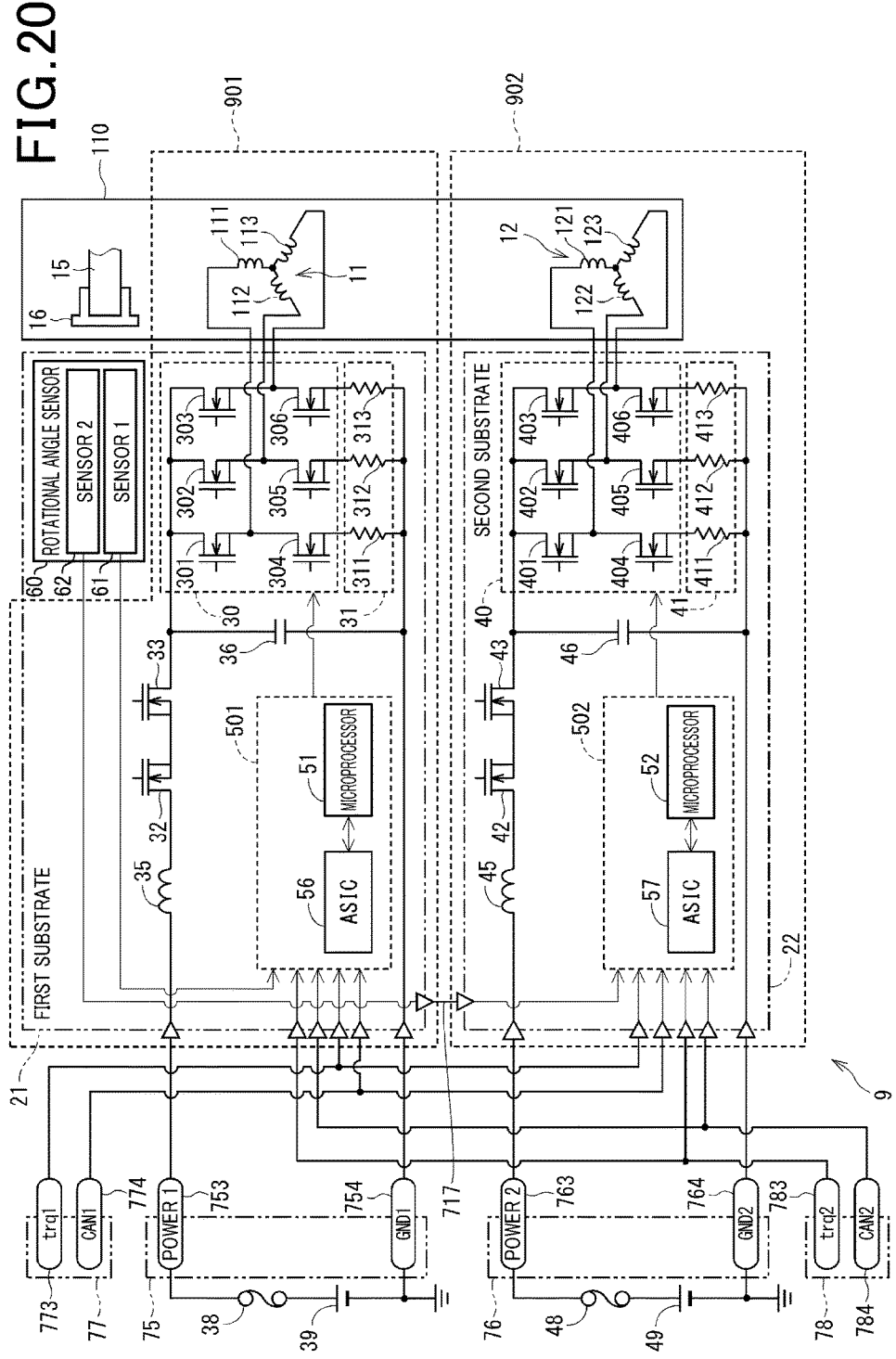
FIG. 20 is a circuit diagram showing a drive apparatus according to a tenth embodiment of the present disclosure.

With reference to FIG. 20, the tenth embodiment of the present disclosure will be described.

In the drive apparatus 9 of the tenth embodiment, two signal connectors 77 and 78 are provided. Similar to the signal terminals 773 and 774 of the first signal connector, the signal terminals 783 and 784 of the second signal connector 78 are connected to the first substrate 21 and the second substrate 22 by the spring terminals 26 and 27. Moreover, similar to the ninth embodiment, the first power supply connector 75 is connected to the first substrate 21 and the second power supply terminal 76 is connected to the second substrate 22. According to the tenth embodiment, the signal terminals 773, 774, 783, 784 and 717 correspond to "connection terminal" and the signal terminals 773, 774, 783 and 784 correspond to "external signal terminal"

Similar effects to the above-described embodiments can be obtained from the configuration of the tenth embodiment.

Eleventh Embodiment

Figure 21:
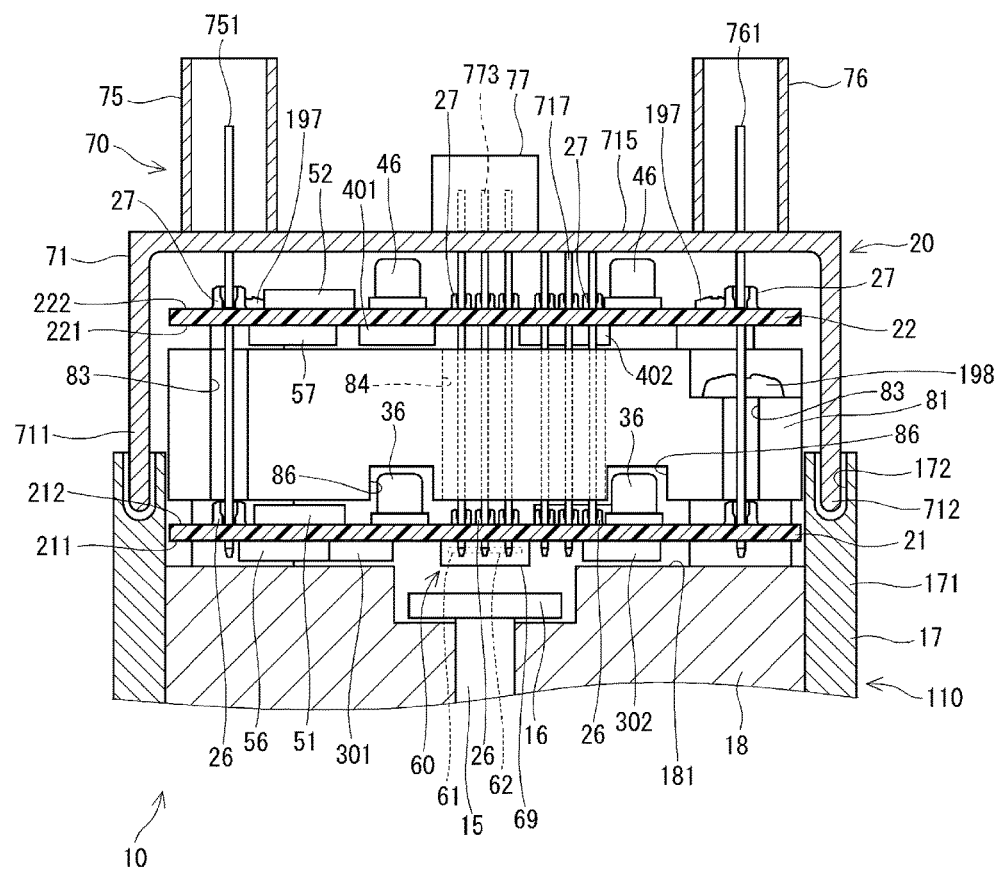
FIG. 21 is a cross-sectional view showing a drive apparatus according to eleventh embodiment of the present disclosure.
Figure 22:
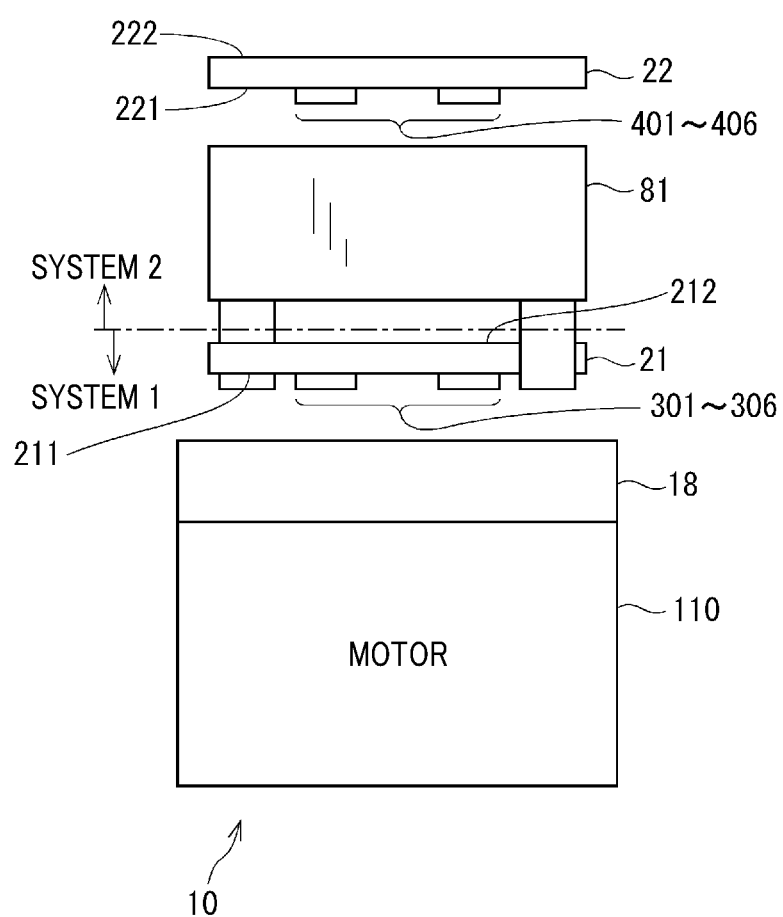
FIG. 22 is a schematic side view showing an arrangement of systems of the drive apparatus according to the eleventh embodiment of the present disclosure.

With reference to FIGS. 21 and 22, the eleventh embodiment of the present disclosure will be described.

According to the drive apparatus 10 of the eleventh embodiment, components mounted on the first surface 211 and components mounted on the second surface 212 of the first substrate 21 differ from those of the seventh embodiment. According to the eleventh embodiment, the SW elements 301 to 306, the current detectors 311 to 313 and the first integrated circuit 56 are mounted on the first surface 211 of the first substrate 21. The first choke coil 35, the first capacitor 36 and the first microprocessor 51 are mounted on the second surface 212 of the first substrate 21. A concave portion 86 accommodating the first capacitor 36 is formed in the heat sink 80 in order to avoid interference between the first capacitor 36 and other circuit components.

The SW elements 301 to 306 mounted on the first surface 211 are provided to be capable of radiating heat to the frame 18. In addition to the SW elements 301 to 306, the current detectors 311 to 313 and the integrated circuit 56 may be provided to be capable of radiating heat to the frame 18. Similar to the seventh embodiment, the SW elements 401 to 406 or the like mounted on the second substrate 22 are provided to be capable of radiating heat to the heat sink 81.

According to the eleventh embodiment, since the substrates 21 and 22 are provided on both sides of the heat sink 81 in the axial direction, similar to the seventh embodiment, heat produced by the first system 901 and the second system 902 are unlikely to influence from each other. The SW elements 301 to 306 are mounted on the first surface 211 of the first substrate 21, and the SW elements 401 to 406 are mounted on the first surface 221 of the second substrate 22. In other words, the SW elements 301 to 306 and the SW elements 401 to 406 are mounted on surfaces in the motor 110 side of the substrates 21 and 22. In the substrates 21 and 22, electronic components which require heat radiation are arranged in the same direction so as to radiate heat in the same direction. Accordingly, a common layout can be used for the substrates 21 and 22 so that the number of components can be reduced. In the eleventh embodiment, a modification of the seventh embodiment is described. However, circuit configuration and the number of connectors may be the same as any of those in the eighth to tenth embodiments.

According to the eleventh embodiment, the SW elements 301 to 306 mounted on the first substrate 21 are arranged to be capable of radiating heat to the frame 18 which forms the outline of the motor 100 at one side of the motor 110 in the axial direction.

The SW elements 401 to 406 mounted on the second substrate 22 are arranged to be capable of radiating heat to the heat sink 81. Thus, a common layout can be used for the substrates 21 and 22 so that the number of components can be reduced.

Twelfth Embodiment

Figure 23:
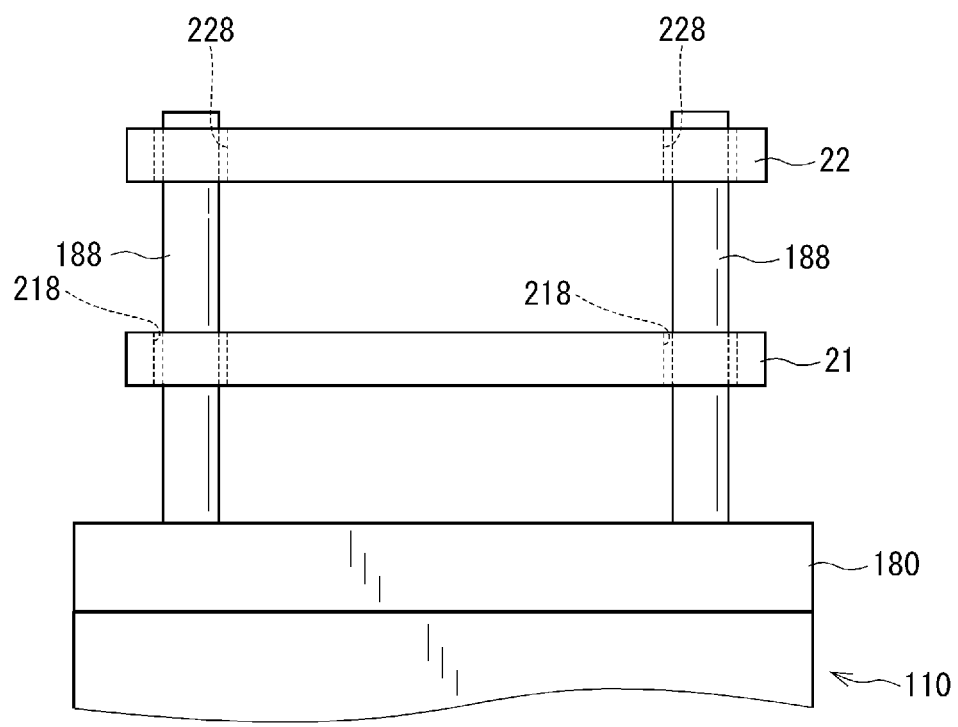
FIG. 23 is a schematic side view showing an alignment of a substrate according to a twelfth embodiment of the present disclosure.
Figure 24:
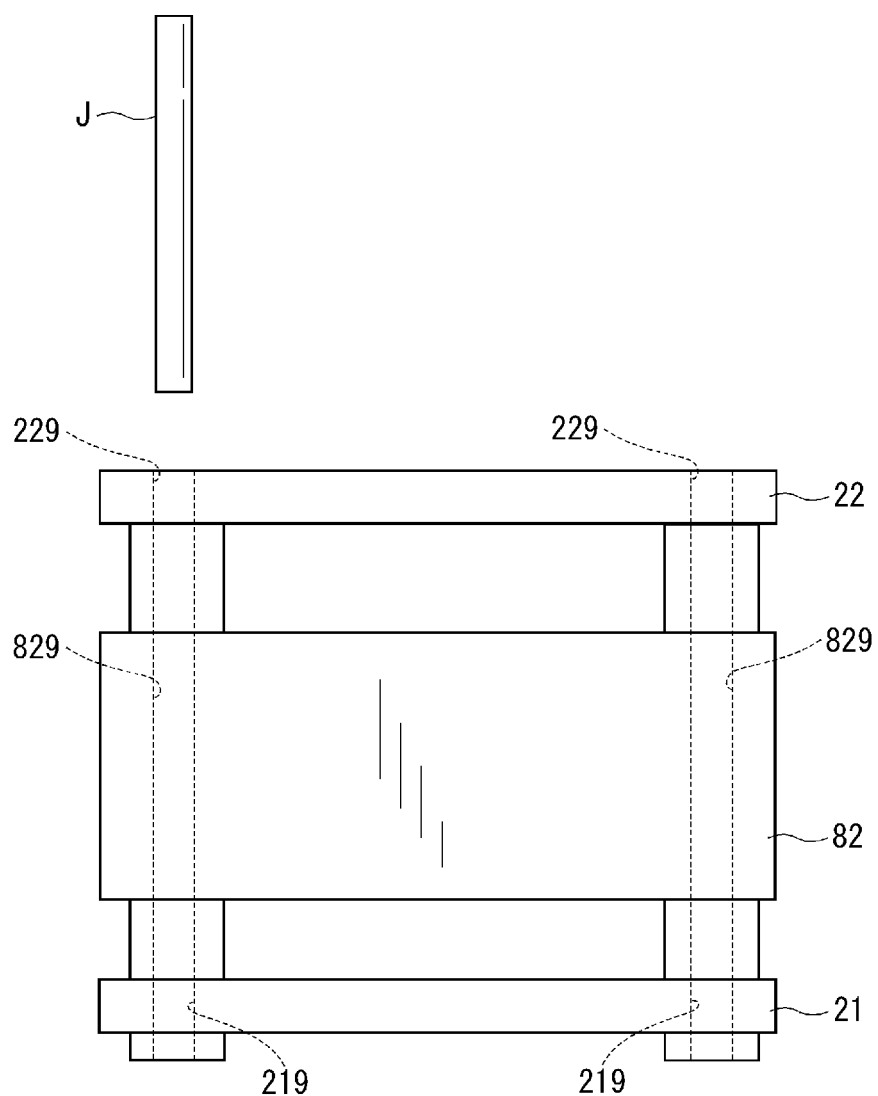
FIG. 24 is a schematic side view showing an alignment of a substrate according to a thirteenth embodiment of the present disclosure.
Figure 25:
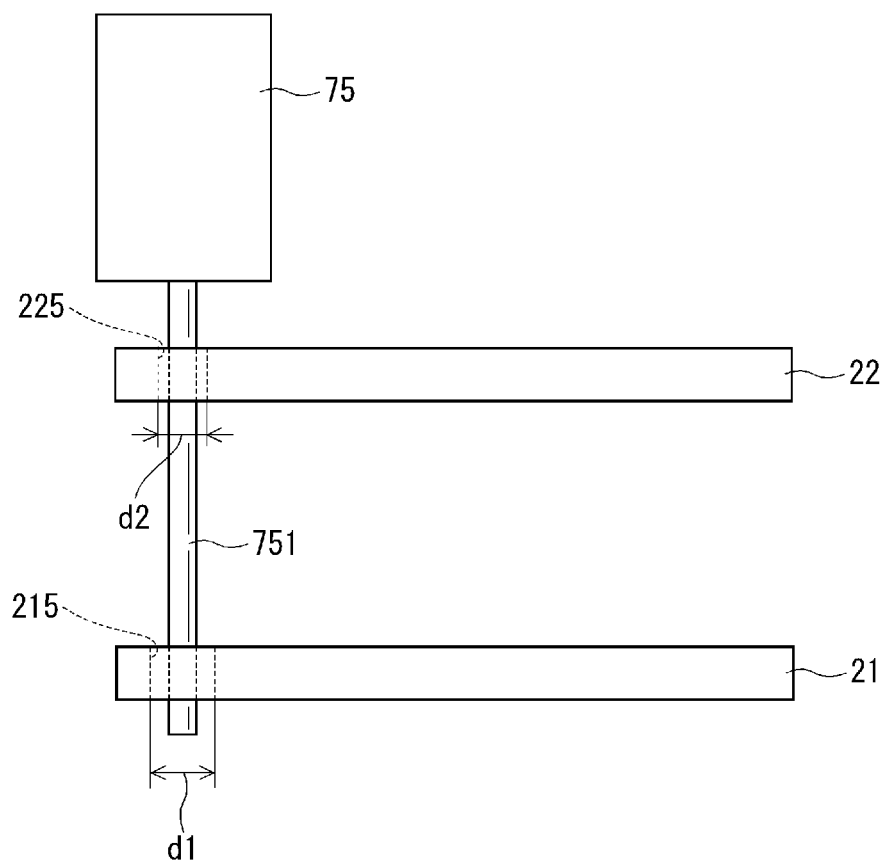
FIG. 25 is a schematic side view illustrating an alignment between a substrate and a connection terminal according to a fourteenth embodiment of the present disclosure.

In the twelfth embodiment to the fourteenth embodiment, an alignment configuration for the substrates 21 and 22 is mainly described. According to the alignment configuration in the twelfth to fourteenth embodiments, circuit configuration, the number of connectors, layout of components mounted on the substrates 21 and 22, or the like can be combined to those in any of the above-described embodiments. FIGS. 23 to 25 are schematic side view diagrams, in which the electronic components and the spring terminals mounted on the substrates 21 and 22 are omitted.

With reference to FIG. 23, the twelfth embodiment of the present disclosure will be described.

As shown in FIG. 23, in the frame 180, a boss section 188 is formed for an alignment, other than the substrate fixing portions 185 and 186. The boss section 188 is formed in a column shape, protruding towards the controller 20 from the frame 18.

A position alignment hole 218 is formed in the first substrate 21, to which the boss section 188 is inserted. A position alignment hole 228 is formed in the second substrate 22 so as to align the position to which the boss section 188 is inserted. By inserting the boss section 188 into the position alignment holes 218 and 228, the substrates 21 and 22 are aligned. Thus, respective terminals can be appropriately inserted into the terminal insertion holes and the spring terminals.

It should be noted that the position of the substrates 21 and 22 in the axial direction is determined by the substrate fixing portions 185 and 186 (not shown in FIG. 23). Similar effects to the above-described embodiments can be obtained from the configuration of the twelfth embodiment.

Thirteenth Embodiment

With reference to FIG. 24, thirteenth embodiment of the present disclosure will be described.

As shown in FIG. 24, a jig insertion hole 829 is formed in the heat sink 82, to which an alignment jig is inserted. In the substrates 21 and 22, jig insertion holes 219 and 229 are formed at portions corresponding to the jig insertion hole 829. According to the thirteenth embodiment, since the jig insertion holes 219, 229 and 829 are formed in the substrates 21 and 22, and the heat sink 82, an alignment jig 3 capable of being inserted into the jig insertion holes 219, 229 and 829 is used so as to align the substrates 21 and 22. Thus, respective terminals can be appropriately inserted into the terminal insertion holes and the spring terminals. Similar effects to the above-described embodiments can be obtained from the configuration of the thirteenth embodiment.

Fourteenth Embodiment

With reference to FIG. 25, fourteenth embodiment of the present disclosure will be described.

As shown in FIG. 25, the connection terminal insertion hole 225 of the second substrate 22 is formed to have smaller size than the connection terminal insertion hole 215 of the first substrate 21. In other words, when it is assumed that the maximum diameter of the connection terminal insertion hole 215 is d1, the maximum diameter of the connection terminal insertion hole 225 is d2, relationship d1>d2 is satisfied. The connection terminal insertion hole 225 of the second substrate 22 located closely to the power supply connector 75 is formed to be smaller, whereby the position of the power terminal 751 is determined, when being assembled, at the connection terminal insertion hole 225 of the second substrate 22. Also, the connection terminal insertion hole 215 of the first substrate 21 located apart from the power supply connector 75 is formed to be larger than the connection terminal insertion hole 225 of the second substrate 22, whereby the power terminal 751 can readily be inserted thereto. As a result, the connection terminal and the substrates 21 and 22 can readily be assembled.

With reference to FIG. 25, a relationship between the power terminal 751 of the power supply connector 75 and the connection terminal insertion holes 215 and 225 has been described. Similarly, for other terminal insertion holes to which other terminals are inserted, the terminal insertion hole of the second substrate 22 is formed to be larger than the terminal insertion hole of the first substrate 21, whereby the assembly thereof can readily be accomplished. Similar effects to the above-described embodiments can be obtained from the configuration of the thirteenth embodiment.

Other Embodiment (A) The Number of Systems

According to the above-described embodiments, two winding groups are provided, in which SW elements and control components are provided for each winding group. According to other embodiment, the number of winding groups may be three or more. Also, three or more pairs of SW element and control component may be provided.

(B) Substrate

According to the above-described embodiments, two substrates are provided. According to other embodiments, three or more substrates may be provided, in which the connection terminals penetrate the substrates.

According to the above-described embodiments, each terminal and the substrate are electrically connected by inserting the terminal into the spring terminal. Also, according to the above-described embodiments, the spring terminals are provided in a surface of a base portion side of the terminal to be inserted. According to other embodiments, the spring terminals may be provided on either one surface of the substrate, or may be provided on a tip-end surface of the terminal to be inserted in each substrate. Also, according to other embodiments, a connection method of connecting the terminal to the substrate is not limited to a method using the spring terminal, but any other method such as a soldering may be used.

According to the above-described embodiments, the terminal and the substrate are connected to be substantially perpendicular. According to other embodiment, the connection terminal may be obliquely inserted relative to a plurality of substrates.

(C) Control Components

According to the above-described embodiment, for the control components, two packages including a microprocessor and an integrated circuit are provided for every system. In other embodiments, the control components may be configured as single package or three or more packages and may be provided for every system. Moreover, any of a pre-drive, a signal amplifier, and a regulator included in the integrated circuit may be omitted. The control components may be shared by a plurality of systems.

(D) Rotation Sensor

According to the first embodiment, the rotation sensor includes two sensors. In other embodiments, the number of sensors included in the rotation sensor may be one or three or more. According to the above-described embodiments, a single sensor includes a function of calculating a rotational angle and a function of calculating rotation frequency. In other embodiments, the function of calculating rotation frequency may be omitted.

According to the above-described embodiments, the first controller uses detection values of the first sensor, and the second controller uses detection values of the second sensor. According to other embodiments, detection values of the first and second sensors may be used for the first and second controllers. In other words, the internal signal terminal may be used to transmit the detection value of the first sensor in addition to the detection value of the second sensor of the rotation sensor.

(E) Connector Unit

According to the above-described embodiments, the connector unit is provided with one or two power supply connectors and one or two signal connectors. According to other embodiments, the number of connectors provided to the connector unit is not limited. Also, according to the above-described embodiments, the opening portion of the connector is located on the opposite side to the motor unit and the harness or the like is inserted to the connector in the axial direction. In other embodiments, an opening direction of the connecter is not limited to the axial direction, but the opening portion may be located radially outside and the harness or the like may be inserted from radially outside.

According to the above-described embodiment, the connector unit includes a power terminal, a ground terminal, a torque signal terminal, a vehicle signal terminal, and an internal signal terminal are provided. In other embodiments, a part of the power terminal, the ground terminal, the torque terminal and the vehicle signal terminal and the internal signal terminal may be omitted. Moreover, instead of the torque signal terminal and the vehicle signal terminal, signals from another sensor or the like can be connected to the connector unit.

According to the above-described embodiments, the internal signal terminal is used for transmitting the detection value of the rotation sensor. In other embodiments, the internal signal terminal may be used for transmitting information between the substrates, the information being other than the detection value of the rotation sensor.

According to the above-described connector unit, the cover and the connector are integrally formed. In other embodiments, the cover and the connector may be provided separately.

According to the above-described embodiments, tip end of the cover in the connector unit is inserted into the groove portion of the motor case, whereby the connector unit is fixed to the motor case. In other embodiments, the connector unit may be fixed to the frame. Moreover, instead of using adhesive, the connector unit may be fixed to the motor case by a screw or the like. The connector unit may be fixed to a frame other than the motor case.

(F) Drive Apparatus

According to the above-described embodiments, the motor is configured as a three-phase brush-less motor. According to the other embodiment, the motor is not limited to three-phase brushless motor, but any other type of motors can be used. Also, the motor is not limited to a motor but may be a generator, or a so-called motor-generator having both of motor and generator functions.

In the above-described embodiment, the drive apparatus is applied to an electric power steering apparatus. According to other embodiments, the drive apparatus may be applied to an apparatus other than the electric power steering apparatus.

As described above, the present disclosure is not limited to the above-described embodiments. However, embodiments may be modified in various ways without departing the scope of the present disclosure.

What is claimed is:

1. A drive apparatus comprising:
   a motor having a plurality of winding groups, rotating about a rotation axis extending in an axial direction thereof;
   a switching element serving as a conduction switch of the winding groups;
   a control component performing driving control of the motor;
   a plurality of substrates provided at one side of the motor in the axial direction, including the switching element and the control component mounted thereon;
   a connector provided at an opposite side of the motor across the substrates in the axial direction; and
   a connection terminal connected to the substrates, wherein
   the substrates are arranged such that a part of the substrates are overlapped when the substrates are projected in the axial direction, an overlapped region being defined as a region where the part of the substrate are overlapped; and
   the connection terminal penetrates, in the overlapped region, at least a part of the substrates, the connection terminal being connected to the substrates in the overlapped region.

2. The drive apparatus according to claim 1, wherein
   the drive apparatus includes a frame that forms an outline of the motor in one side thereof in the axial direction;
   the plurality of substrates are two in number, including a first substrate disposed in a motor side close to the motor, and a second substrate disposed in a connector side close to the connector;
   the switching element is mounted on a motor side surface of the firsts substrate, and arranged to be capable of radiating heat to the frame; and
   the control component is mounted on the second substrate.

3. The drive apparatus according to claim 1, wherein
   the drive apparatus includes a heat sink;
   the plurality of substrates are two in number, including a first substrate disposed in a motor side close to the motor, and a second substrate disposed in a connector side close to the connector;
   the heat sink is provided between the first substrate and the second substrate;
   each of the first substrate and the second substrate includes a plurality of switching elements and the control component mounted thereon; and
   at least a part of the switching elements are mounted on a heat sink side surface of the substrates, and arranged to be capable of radiating heat to the heat sink.

4. The drive apparatus according to claim 3, wherein
   the plurality of switching elements includes a first switching elements and a second switching elements,
   the first switching elements mounted on the first substrate are arranged to be capable of radiating heat to the frame; and
   the second switching elements mounted on the second substrate are arranged to be capable of radiating heat to the heat sink.

5. The drive apparatus according to claim 3, wherein
   the plurality of winding groups are two in number, the winding groups including a first winding group and a second winding group;
   the first switching elements serves as conduction switches for the first winding group;
   the first switching elements and the control component are mounted on the first substrate;
   the second switching elements serves as conduction switches for the second winding group; and
   the second switching elements and the control component are mounted on the second substrate.

6. The drive apparatus according claim 1, wherein
   each of the substrate is provided with a spring terminal including an insertion portion capable of being elastic deformed by inserting a terminal, and a substrate connecting portion electrically connected to the substrate; and the connection terminal contacts the spring terminal, as being inserted into the spring terminal, so as to connect the plurality of substrates.

7. The drive apparatus according to claim 1, wherein
the first substrate provided in a portion proximate to the motor is provided with a rotation sensor that detects rotation of the motor.

8. The drive apparatus according to claim 7, wherein
the rotation sensor includes a plurality of sensors that detect a rotational angle of the motor.

9. The drive apparatus according to claim 8, wherein
the plurality of sensors are mounted on the motor side surface.

10. The drive apparatus according to claim 8, wherein
a part of the sensors are mounted on the motor side surface; and
rest of the sensors are mounted on a surface in an opposite side of the motor.

11. The drive apparatus according to claim 1, wherein
The motor is provided with a rotation sensor that detects rotation of the motor;
the rotation sensor includes a rotation sensor terminal that penetrates a part of the substrates in the overlapped region, the rotation sensor terminal being capable of transmitting a detection signal to one substrate other than a motor side substrate disposed proximate to the motor in the plurality of substrates.

12. The drive apparatus according to claim 1, wherein
the connection terminal includes a power terminal that connects a battery with the substrates, and a ground terminal that connects a ground with the substrates.

13. The drive apparatus according to claim 1, wherein
the connection terminal includes an external signal terminal capable of transmitting a signal acquired from an external member.

14. The drive apparatus according to claim 1, wherein
the connection terminal includes an internal signal terminal used for transmitting a signal among the plurality of substrates.

15. An electric power steering apparatus comprising:
a drive apparatus including:
   a motor having a plurality of winding groups, rotating about a rotation axis extending in an axial direction thereof,
   a switching element serving as a conduction switch of the winding groups,
   a control component performing driving control of the motor,
   a plurality of substrates provided at one side of the motor in the axial direction, including the switching element and the control component mounted thereon,
   a connector provided at an opposite side of the motor across the substrates in the axial direction, and
   a connection terminal connected to the substrates, wherein
   the substrates are arranged such that a part of the substrates are overlapped when the substrates are projected in the axial direction,
   an overlapped region being defined as a region where the part of the substrate are overlapped, and the connection terminal penetrates, in the overlapped region, at least a part of the substrates, the connection terminal being connected to the substrates in the overlapped region, and
a power transmission member that transmits power of the motor outputting an auxiliary torque to a drive object, the auxiliary torque assisting a steering operation of a driver using a steering member.

* * * * *